(12) United States Patent
Nakagawa et al.

(10) Patent No.: US 6,609,503 B1
(45) Date of Patent: Aug. 26, 2003

(54) VEHICULAR FUEL TANK STRUCTURE

(75) Inventors: Mitsuo Nakagawa, Saitama (JP); Masao Ogawa, Saitama (JP); Keiichiro Takagi, Saitama (JP); Toichiro Hikichi, Saitama (JP); Akira Hamauzu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 196 days.

(21) Appl. No.: 09/654,585

(22) Filed: Sep. 1, 2000

(30) Foreign Application Priority Data

Sep. 2, 1999 (JP) .............................. 11-249371
Jun. 9, 2000 (JP) ...................... 2000-174520

(51) Int. Cl.$^7$ ............................................. F02M 37/04
(52) U.S. Cl. .................. 123/509; 123/510; 137/565.34
(58) Field of Search ................. 123/509, 514, 123/510; 137/382, 565, 565.34; 220/304

(56) References Cited

U.S. PATENT DOCUMENTS

| | | | | |
|---|---|---|---|---|
| 4,919,103 A | * | 4/1990 | Ishiguro et al. | 123/514 |
| 5,330,068 A | * | 7/1994 | Duhaime et al. | 220/304 |
| 5,394,902 A | * | 3/1995 | Shibao | 137/565 |
| 5,664,811 A | * | 9/1997 | Martus et al. | 292/144 |
| 5,669,359 A | * | 9/1997 | Kleppner et al. | 123/509 |
| 6,192,918 B1 | * | 2/2001 | Jaasma et al. | 137/382 |
| 6,230,690 B1 | * | 5/2001 | Umetsu | 123/509 |
| 6,308,733 B2 | * | 10/2001 | Murakoshi et al. | 137/565.34 |

FOREIGN PATENT DOCUMENTS

JP          Y2534265          8/1993

* cited by examiner

Primary Examiner—Carl S. Miller
(74) Attorney, Agent, or Firm—Birch, Stewart, Kolasch & Birch, LLP

(57) ABSTRACT

A fuel supply port portion incorporates tank fittings such as a fuel pump and a residual fuel meter unit integrally therein as a tank fittings assembly. The fuel supply port portion is formed as a separate body from a tank body of a fuel tank and is removably attached to the tank body. The structure of the tank body can be simplified, and in the case where the tank body is made of a resin, it is not necessary to perform an insert molding operation. Consequently, it is possible to fabricate the tank body easily and also possible to thin the tank body, thereby ensuring a sufficient capacity of the fuel tank. Further, since tank fittings mounting portions are concentrated in the fuel supply port portion, it is possible to assemble the fuel tank in an efficient manner.

19 Claims, 24 Drawing Sheets

VEHICULAR FUEL TANK STRUCTURE

BACKGROUND OF THE INVENTION

1. Field of the Invention

The present invention relates to a fuel tank structure for a vehicle having a tank body with a simplified structure, which allows the tank body to be easily fabricated.

2. Description of the Background Art

A vehicular fuel tank structure is known, for example, in Japanese Utility Model Publication No. Hei 5-34265. In FIG. 1 of the above publication, a fuel tank 1 is shown in which an upper fuel supply port 3 is formed in an upper position, a cap 4 is attached to the upper fuel supply port 3, and a fuel pump 7 is disposed in the interior of the fuel tank.

In the above prior art, in addition to the upper fuel supply port 3 for the attachment of the cap 4 thereto, various elements must be formed by molding in the fuel tank 1. These elements include mounting portions for the mounting of tank fittings such as a bracket 6 for fixing the fuel pump 7, a support plate 17 for fixing a fuel pipe 10 and a vent pipe 16, and a residual fuel meter unit for measuring a residual amount of fuel 2. This results in a complicated structure of the fuel tank 1, an increase in the number of machining steps in the manufacture, difficulty of assembly, and an increase of the manufacturing cost.

When forming the fuel tank with a resin by blow molding, the fuel supply port 3 and the bracket 6 are placed into a mold before molding the fuel tank, followed by insert molding. The result is that the fittings mounting work becomes complicated, including positioning of the fuel supply port 3 and the bracket 6. Also, the wall thickness of the insert-molded portion increases, and hence a larger external form of the fuel tank is required for ensuring a predetermined capacity.

SUMMARY OF THE INVENTION

It is therefore an object of the present invention to provide a vehicular fuel tank structure having a simple tank body structure, which dispenses with insert molding in the case where the tank body is made of a resin, and which is easily capable of ensuring a predetermined capacity easily and being assembled in an efficient manner.

For achieving the above-mentioned object, a fuel supply port portion of the fuel tank incorporates such tank fittings as a fuel pump and a residual fuel meter unit integrally therein. The fuel supply port portion is formed as a separate member from a tank body of the fuel tank and is removably attached to the tank body. Tank fittings such as a fuel pump and a residual fuel meter unit are integrally incorporated into a fuel supply port portion, and the fuel supply port portion with the tank fittings thus incorporated therein is removably attached to the tank body.

As a result, since the tank body is not required to be formed with tank fittings mounting portions, the structure of the tank body can be simplified, and in the case of forming the tank body with a resin, it is not necessary to perform the insert molding, but a simple blow molding is sufficient, thus permitting the tank body to be fabricated easily. Therefore, the fuel tank manufacturing cost can be reduced. Moreover, since the insert molding is not necessary, it is possible to thin the tank body, which makes it easily possible to ensure a required fuel tank capacity. Further, since tank fittings mounting positions are concentrated in only the fuel supply port portion, it is possible to effect assembly efficiently.

The fuel supply port portion is provided with the fuel pump, a fuel filter housing which receives therein a fuel filter disposed on a discharge side of the fuel pump, and a tank mounting portion for removably mounting the fuel supply port portion to the tank body, in this order. One of a pair of pump shaft support portions for supporting a pump shaft of the fuel pump and one end portion of the fuel filter housing are integrally connected with each other.

One of the pump shaft support portions and the fuel filter housing are sub-assembled and connected integrally. Thereafter, the fuel supply port portion is assembled by the thus sub-assembled pump shaft support portion and fuel filter housing. Since one of the pump shaft support portions and one end portion of the fuel filter housing are integrally connected with each other, it is possible to effect the assembly of the fuel supply port portion easily. Moreover, without separately providing a conduit such as a hose or the like for connecting the fuel pump and the fuel filter housing with each other, a fuel passage can be formed integrally in part of one pump shaft support portion and fuel filter housing, thus making it possible to reduce the number of components used and reduce the number of conduit mounting steps. Further, it is possible to decrease the distance between each pump shaft support portion and the fuel filter housing and hence possible to attain an effective utilization of space and construct the fuel supply port portion compactly in a small size.

A pressure regulator is provided in the fuel supply port portion for regulating the pressure of fuel to be supplied to the engine. An end portion of the pressure regulator and an opposite end portion of the fuel filter housing are integrally connected with each other. The sub-assembled pump shaft support portion and fuel filter housing are further sub-assembled and integrally connected with the pressure regulator. Thereafter, the fuel supply port portion is assembled by the thus sub-assembled pump shaft support portion, fuel filter housing and pressure regulator.

Since the opposite end portion of the fuel filter housing thus sub-assembled with one pump shaft support portion and an end portion of the pressure regulator are integrally connected with each other, the assembly of the fuel supply port portion can be performed more easily. Moreover, a fuel passage can be formed integrally in part of one pump shaft support portion, fuel filter housing and pressure regulator without separately providing conduits such as hoses or the like for connecting the fuel pump, the fuel filter housing, and the pressure regulator with one another. Thus, it is possible to reduce the number of components used and the number of conduit mounting steps. Further, each pump shaft support portion, the fuel filter housing, and the pressure regulator can be disposed at short distances from one another, so that the space concerned can be utilized effectively and the fuel supply port portion can formed compactly in a small size.

A part of a discharge path for discharge of the fuel to the exterior of the fuel tank is integrally formed in the pressure regulator by molding. In comparison with the case where the discharge path is formed separately from the pressure regulator, it is possible to reduce the number of components used and reduce the pressure regulator manufacturing cost and mounting cost.

The tank mounting portion is cylindrical, and a filler serving as a fuel inlet port of the fuel tank is attached to one opening side of the tank mounting portion. A part on an opposite opening side of the tank mounting portion is extended to form an extended portion, and the fuel pump is attached to the extended portion. Since the tank mounting portion is cylindrical, it is easy to mount the filler and it is possible to accommodate tank fittings and form a fuel passage in the interior of the cylinder. Further, since the extended portion is formed, it becomes easier to install the fuel pump and other tank fittings.

A filler serving as a fuel inlet port is provided in the fuel supply port portion, and a filler-side cylindrical portion is provided in the filler. A receiving portion is formed at an opening end of the filler-side cylindrical portion, and the tank body is formed by blow molding. A tank-side cylindrical portion is provided on an opening side of the tank body, and the tank-side cylindrical portion has a protuberance to be disengageably engaged with the receiving portion.

The filler-side cylindrical portion of the filler is fitted on the tank-side cylindrical portion of the tank body and the receiving portion of the filler-side cylindrical portion is brought into engagement with the protuberance of the tank-side cylindrical portion, whereby the filler can be easily coupled to the tank body.

A cylindrical holder is attached to the fuel supply port portion, and the tank fittings are incorporated in the cylindrical holder. A float for detecting a residual fuel quantity is provided in the residual fuel meter unit incorporated in the fuel supply port portion. The float is movable vertically through an arm, and a highest or lowest position in the range of the vertical movement of the float is set within a virtual extended cylinder as an extension of an outer peripheral surface of the cylindrical holder.

Thus, the highest or lowest position in the vertical movement range of the float is set within a virtual extended cylinder as an extension of an outer peripheral surface of the cylindrical holder. In a state in which the float is disposed in the highest or lowest position in its vertical movement range and substantially rectilinearly in the longitudinal direction of the cylindrical holder, the fuel supply port portion is inserted and mounted into the tank body. Thus, when inserting the fuel supply port portion into the tank body, the float is not an obstacle at all and the assembly of the fuel tank can be done smoothly, that is, the productivity of the fuel tank can be improved.

A guide pipe is installed in the fuel supply port portion. The guide pipe conducts the fuel into the tank body during fuel supply and directs a fuel flow in a direction inclined relative to an extending direction of a virtual line which connects an inlet of the fuel supply port portion and the tank fittings, thereby allowing the fuel to flow while avoiding the tank fittings. With the guide pipe provided, the fuel is conducted into the tank body and is allowed to flow while avoiding the tank fittings, thus smoothing the fuel flow and preventing bubbling of the fuel.

A cylindrical holder is attached to the fuel supply port portion, and the tank fittings are incorporated in the cylindrical holder. An outlet of the guide pipe is allowed to face an inner surface of the cylindrical holder located between the fuel supply port portion and the tank fittings. A through hole is formed in a side face portion of the cylindrical holder adjacent to the outlet. In the fuel tank with tank fittings incorporated in the cylindrical holder, a through hole is formed in a side face portion of the cylindrical holder and an outlet of the guide pipe is allowed to face the through hole, allowing the fuel to flow smoothly from the outlet of the guide pipe into the tank body through the through hole formed in the cylindrical holder to prevent bubbling of the fuel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
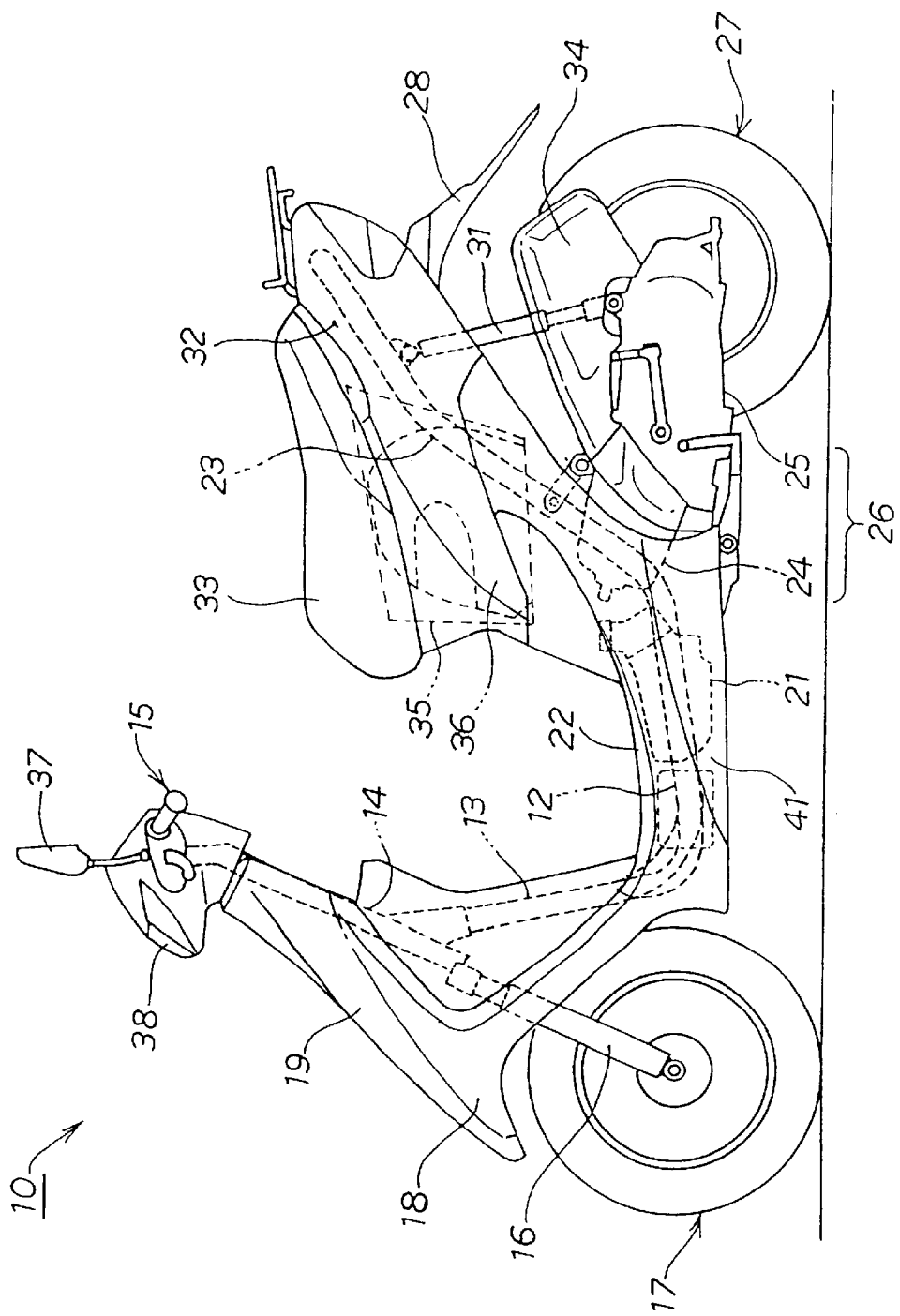
FIG. 1 is a side view of a two-wheeled motor vehicle to which a fuel tank structure according to the present invention is applied.
Figure 2:
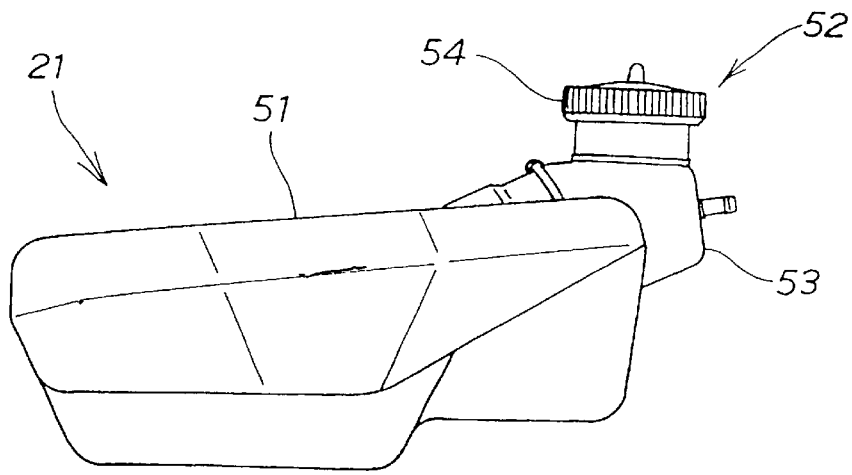
FIG. 2 is a side view of a fuel tank structure according to a first embodiment of the present invention.

Embodiments of the present invention will be described herein with reference to the accompanying drawings. A two-wheeled motor vehicle 10 comprises a head pipe 14 attached to a front down-tube 13 of a vehicle body frame 12. An upper bar handle 15 and a lower front fork 16 are both rotatably supported by the head pipe 14. A front wheel 17 is rotatably supported by a lower end of the front fork 16. A front fender 18 covers an upper portion of the front wheel 17. A front cover 19 covers an upper portion of the front fork 16 and also covers the head pipe 14. A fuel tank 21 according to the first embodiment of the present invention is mounted to the body frame 12. A floor step 22 is mounted above the fuel tank 21.

The two-wheeled motor vehicle 10 is also provided with a power unit 26 which comprises an engine 24 and a transmission 25 both disposed below a rear frame 23. A rear wheel 27 is provided which receives a driving force from the transmission 25. A rear fender 28 covers an upper portion of the rear wheel 27, and a shock absorber 31 absorbs vibrations from the rear wheel 27. A frame body cover 32 covers the rear frame 23, and a seat 33 is disposed above the frame body cover 32. The two-wheeled motor vehicle 10 also includes an air cleaner 34, a helmet receiving box 35, a helmet 36, a mirror 37, a headlight 38, and an under cover 41.

Figure 3:
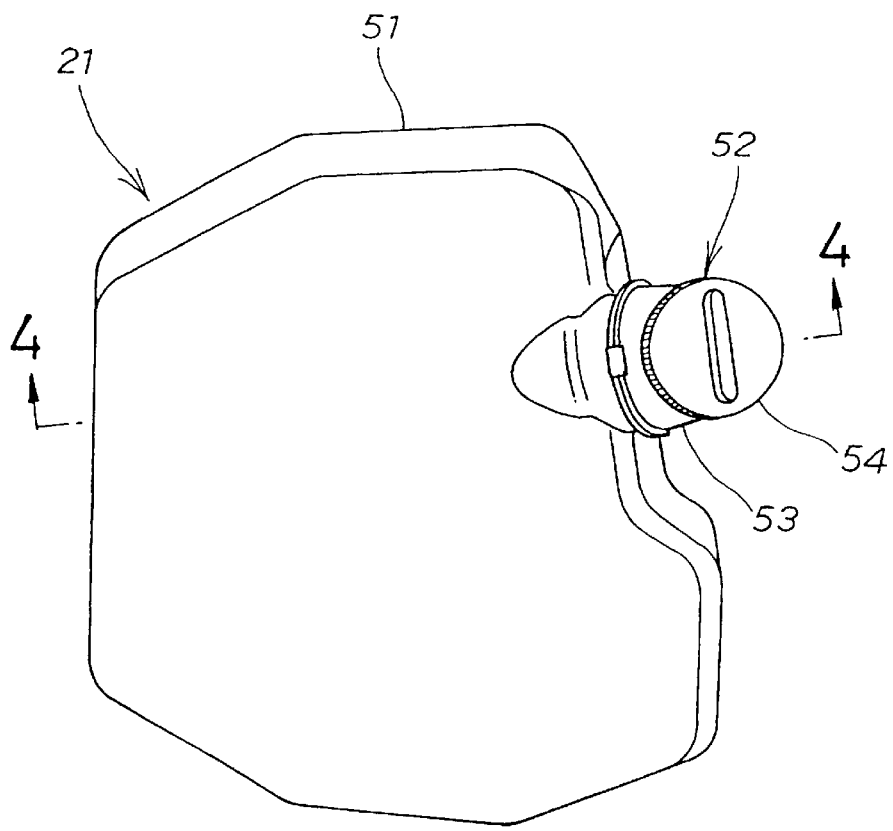
FIG. 3 is a plan view of the fuel tank structure of the first embodiment.

This first embodiment will be described below with reference to FIGS. 2 to 7. The fuel tank 21 is made up of a resinous tank body 51 and a fuel supply port portion 52 attached to the tank body 51. In FIG. 3, in the fuel tank 21, the tank body 51 is a tank of a simple structure formed by blow molding, not requiring any such mounting portions as in the prior art for tank fittings, e.g., fuel supply port, residual fuel meter unit, fuel pipe, and vent pipe. The fuel supply port portion 52 is provided with a filler 53 and a filler cap 54 which closes a mouth of the filler 53.

Figure 4:
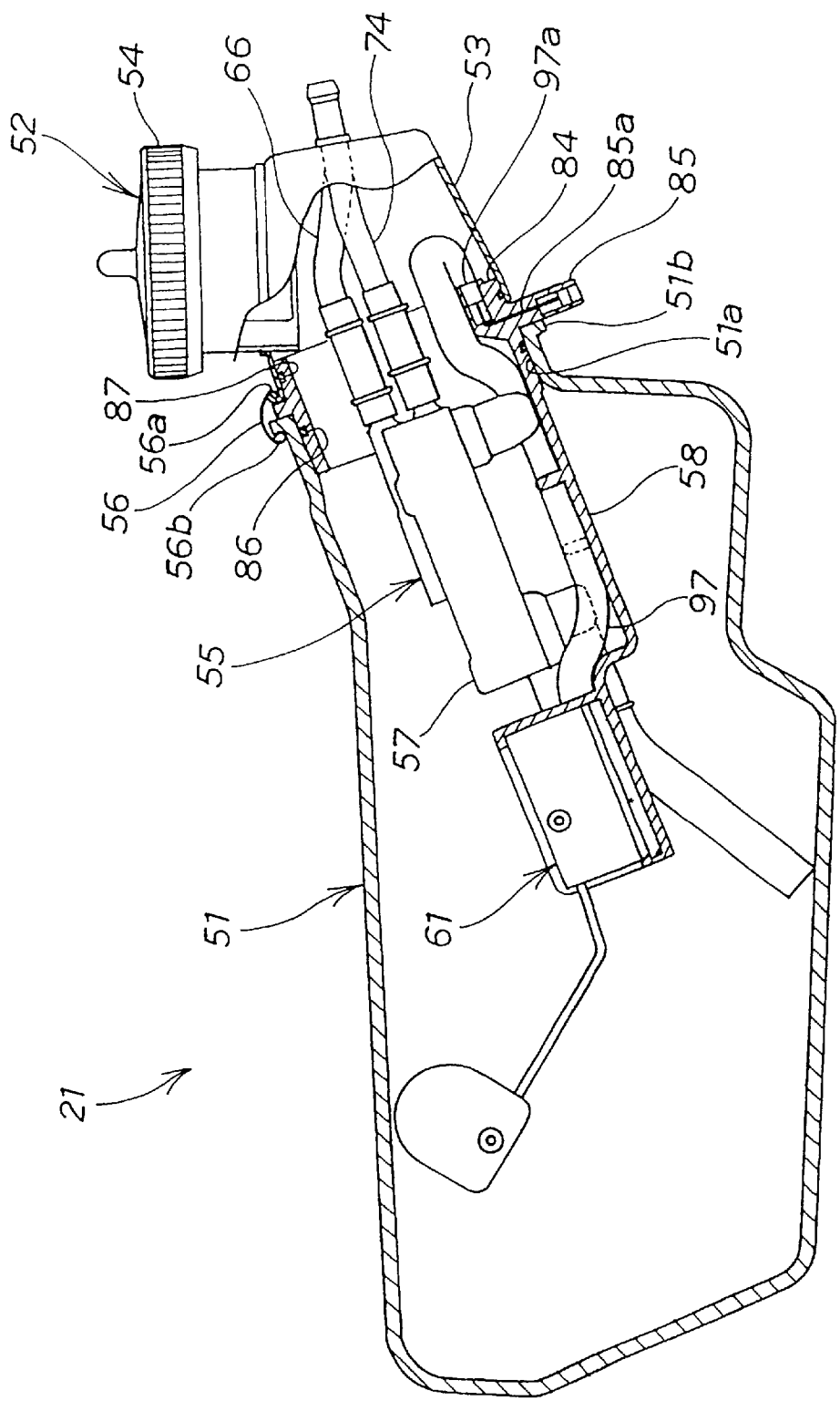
FIG. 4 is a sectional view taken on line 4—4 in FIG. 3.

As shown in FIG. 4, the fuel supply port portion 52 is provided with a tank fittings assembly 55 which is inserted almost wholly into the tank body 51, the tank fittings assembly 55 being fixed to the tank body 51 with a plurality of clamp members 56, only one being shown in the figure. The tank body 51 is provided with an opening 51a through which the tank fittings assembly 55 is inserted into the tank body, and is also provided with a flange portion 51b formed along an edge portion of the opening 51a. The tank fittings assembly 55 comprises a fuel pump 57, a pump holder 58 for holding the fuel pump 57, and a residual fuel meter unit 61 attached to the pump holder 58. Each clamp member 56 is formed in an arcuate shape from a plate spring. One end portion 56a of the clamp member 56 is bent in a hook shape, while an opposite end portion 56b thereof is rounded.

Figure 5:
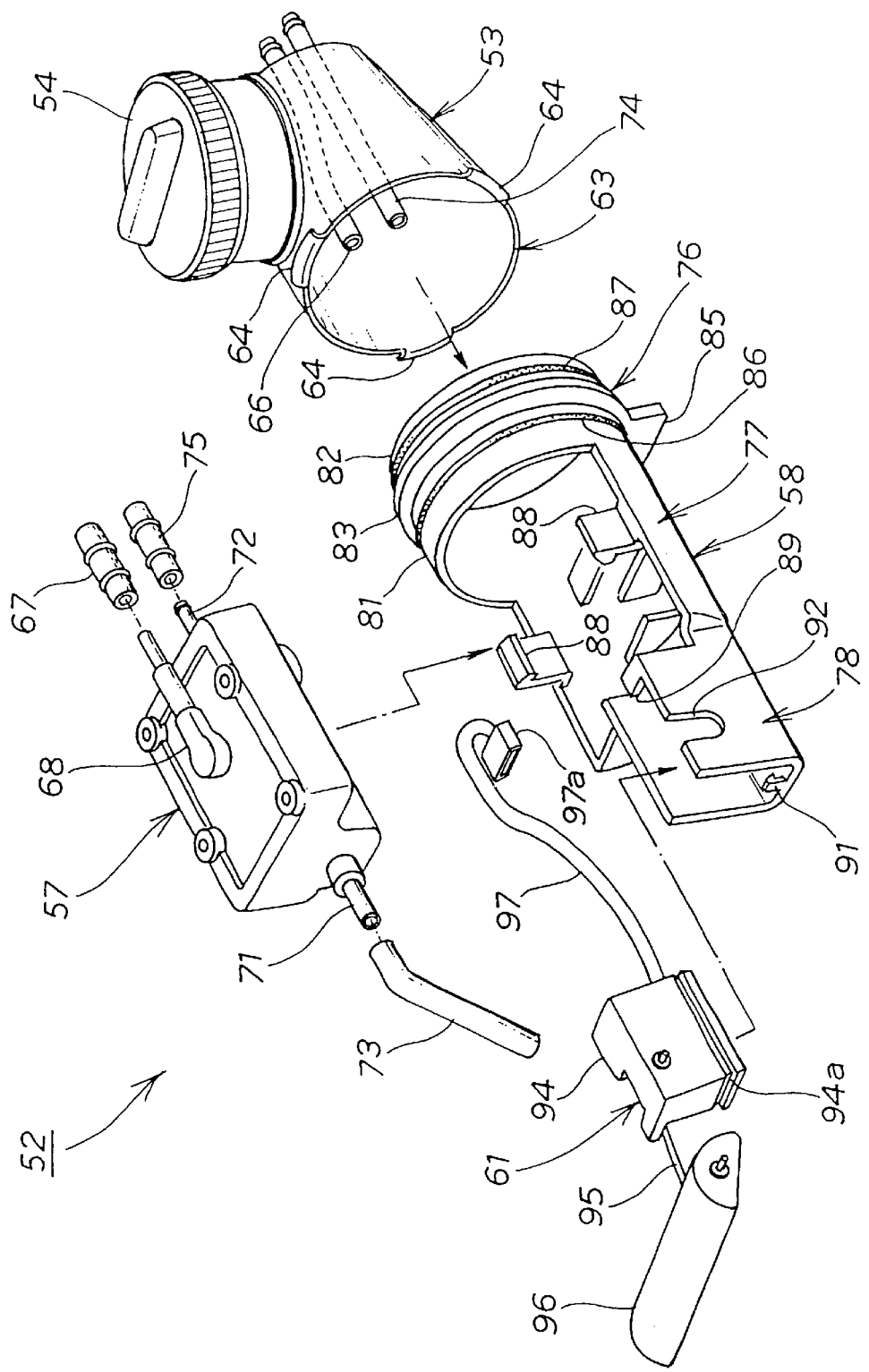
FIG. 5 is a perspective view illustrating a construction of a principal portion of the fuel tank structure and how to assemble the fuel tank structure of the first embodiment.

As shown in FIG. 5, in the fuel supply port portion 52, arcuate lugs 64 for engagement with the clamp members 56 (see FIG. 4) are formed on an edge portion of an opening 63 of the filler 53. The fuel pump 57 is a pulse pressure driven type pump and is provided with a pulse pressure introducing portion 68 which is connected to a pulse pressure source on a negative pressure side of the engine through a conduit 66 and a connecting tube 67, a suction port 71 which sucks in fuel through a check valve (not shown) with vibration of a diaphragm (not shown) caused by a pulse pressure transmitted to the pulse pressure introducing portion 68, and a discharge port 72 through which the fuel sucked in from the suction port 71 is transmitted to a carburetor (not shown). The numeral 73 denotes a fuel suction pipe, numeral 74 denotes a fuel discharge pipe, and numeral 75 denotes a connecting tube for connection between the discharge port 72 and the discharge pipe 74. The conduit 66 and the discharge pipe 74 are mounted to the filler 53.

The pump holder 58 is made up of a cylindrical portion 76, a pump support portion 77 extending from the cylindrical portion 76, and a residual fuel meter unit 78 provided at an end portion of the pump support portion 77. The cylindrical portion 76 comprises a tank body-side inserting portion 81 for insertion into the opening 51a of the tank body 51 (see FIG. 4), a fuel supply port-side inserting portion 82 for insertion into the opening 63 of the fuel supply port portion 52, a flange portion 83 formed between the tank body-side inserting portion 81 and the fuel supply port-side inserting portion 82, an input-side connector 84 (see FIG. 4) provided on an inner periphery side of the flange portion 83, and an output-side connector 85 (see FIG. 4) provided on an outer periphery side of the flange portion. Numeral 86 denotes an O-ring fitted on the tank body-side inserting portion 81 and numeral 87 denotes an O-ring fitted on the fuel support port-side inserting portion 82. The input-side and output-side connectors 84, 85 are brought into electric conduction with each other through a connecting terminal 85a, as shown in FIG. 4.

In FIG. 5, the pump support portion 77 is of a semi-cylindrical shape and is provided at upper edges thereof with a pair of pawl portions 88 for engagement with and fixing the fuel pump 57. The residual fuel meter unit support portion 78 has a generally U-shaped section and is provided with a projection 89 for engagement with an upper portion of the residual fuel meter unit 61 and a pawl portion 91 for engagement with a lower portion (more specifically, a groove 94a) of the residual fuel meter unit 61. Numeral 92 denotes a cutout portion for passage of an end portion of a lever 95 of the residual fuel meter unit 61.

The residual fuel meter unit 61 comprises a residual fuel meter body 94, a lever 95 swingably attached to the residual fuel meter body 94, a float 96 attached to a front end of the lever 95, and a wiring harness 97 for taking out a residual fuel signal to the exterior. A connector 97a attached to an end portion of the wiring harness 97 is connected to the input-side connector 84 (see FIG. 4), and the output-side connector 85 is wired to a control unit (not shown). According to this structure, the resistance value of a variable resistor incorporated in the residual fuel meter body 94 is varied by changing the position of the float 96 through the lever 95 and a residual amount of fuel is sent as a residual fuel signal to the control unit through the wiring harness 97. In accordance with the residual fuel signal the control unit displays the residual amount of fuel on a residual fuel display portion. The numeral 94a denotes a groove formed in a lower portion sideways of the residual fuel meter body 94.

As described above with reference to FIG. 4, since the input-side and output-side connectors, 84, 85 are integrally provided in the pump holder 58, holes for the passage of conductors such as the wiring harness 97 need not be formed in the tank body 51 and the filler 53. Consequently, the structure for sealing the fuel tank 21 can be simplified.

The following description is now provided about how to assemble the fuel tank 21 constructed as above. In FIG. 5, first the residual fuel meter unit 61 is inserted into the residual fuel meter unit support portion 78 of the pump holder 58. The projection 89 is brought into engagement with an upper portion of the residual fuel meter body 94, and the pawl portion 91 is engaged with the groove 94a formed in the residual fuel meter body 94, thus allowing the residual fuel meter unit 61 to be mounted to the pump holder 58. Next, the wiring harness 97 of the residual fuel meter unit 61 is allowed to extend on the bottom of the pump support portion 77 and the connector 97a is connected to the input-side connector. Thereafter, the O-ring 86 is fitted on the tank body-side inserting portion 81 of the pump holder 58 and the O-ring 87 is fitted on the fuel supply port-side inserting portion 82.

Then, the connecting tube 67 is fitted on the conduit 66 and the connecting tube 75 is fitted on the discharge pipe 74. In this state, the opening 63 of the filler 53 is fitted with the fuel supply port-side inserting portion 82 of the pump holder 58. Next, the pulse pressure introducing portion 68 of the fuel pump 57 is fitted in the connecting tube 67 and the discharge port 72 of the fuel pump 57 is fitted in the connecting tube 75. Further, the suction pipe 73 is fitted on the suction port 71. Subsequently, the fuel pump 57 is pushed into the pump support portion 77 of the pump holder 58 from above, allowing the pawl portions 88 to be engaged with the fuel pump 57. In this way, the fuel pump 57 is mounted to the pump holder 58. The assembly of the fuel supply port portion 52 is now completed. Thus, the fuel pump 57 and the residual fuel meter unit 61 can be mounted to the pump holder 58 easily by merely being engaged with the pawl portions 88, projection 89, and pawl portion 91 without using bolts and nuts. Consequently, both assemblability and productivity can be further improved.

Figure 6:
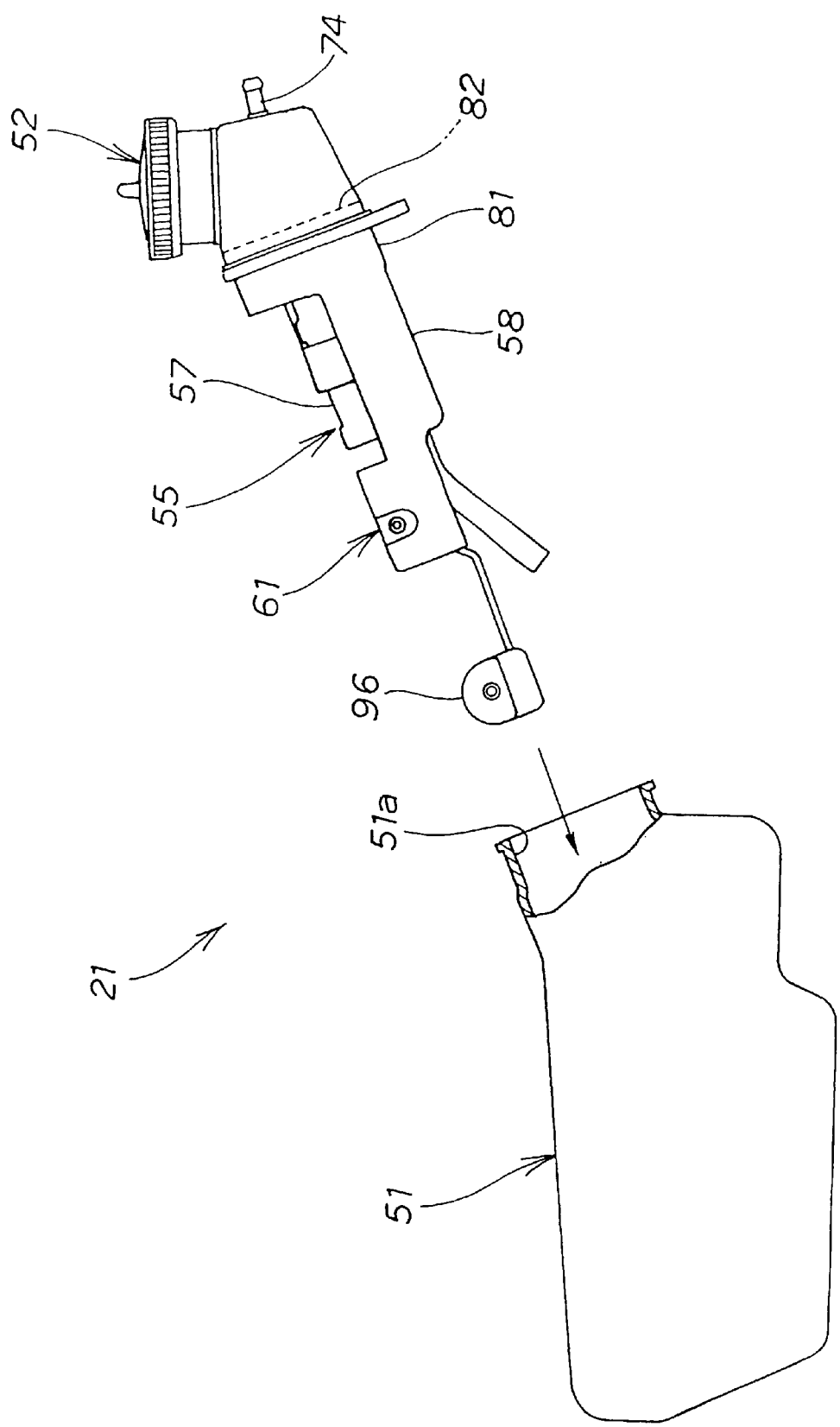
FIG. 6 is a side view illustrating how to assemble the fuel tank structure of the first embodiment.

Referring now to FIG. 6, the tank fittings assembly 55 of the fuel supply port portion 52 assembled above is inserted into the opening 51a of the tank body 51. In this case, the float 96 of the residual fuel meter unit 61 is moved beforehand so as to be disposed nearly linearly in the longitudinal direction of the pump holder 58, lest it should be an obstacle to the insertion of the tank fittings assembly.

Figure 7:
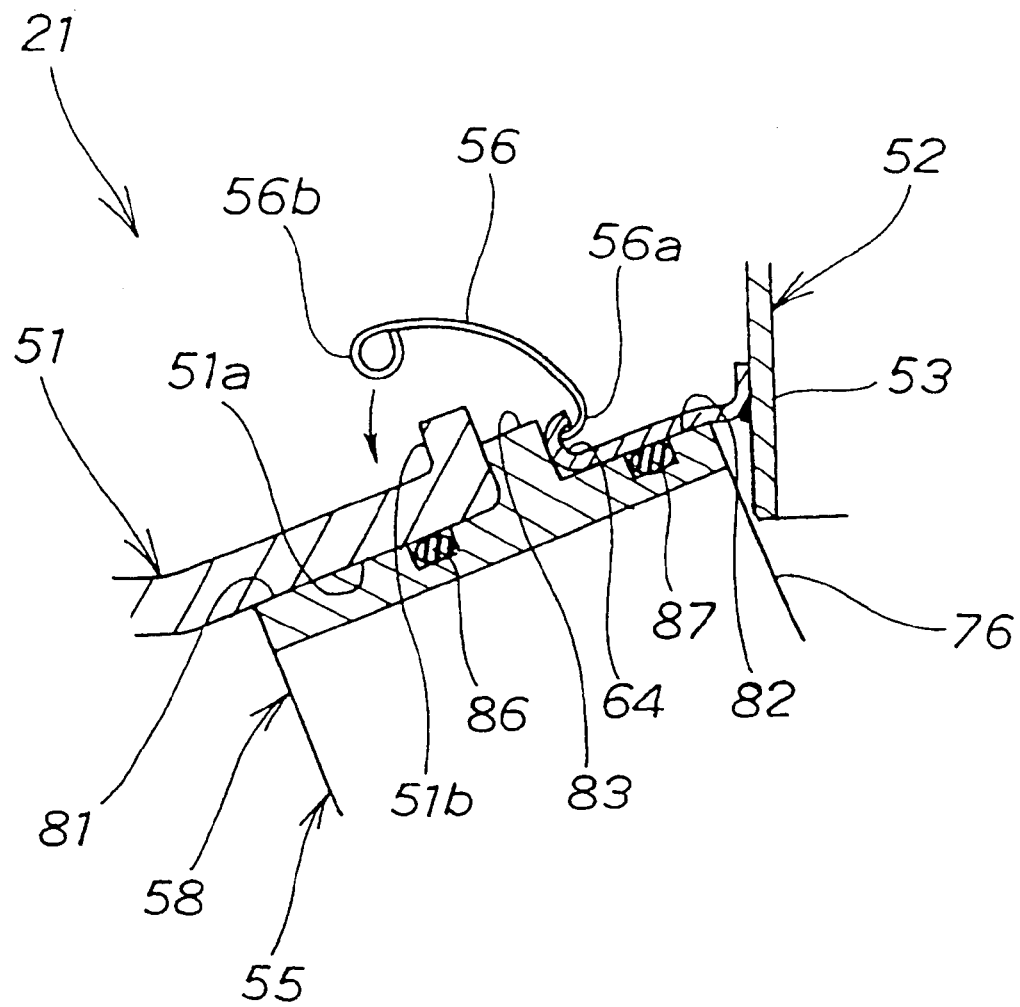
FIG. 7 is an enlarged sectional view of a principal portion, illustrating how to assemble the fuel tank structure of the first embodiment.

Referring now to FIG. 7, after the procedure referred to above in connection with FIG. 6 is completed, one end portion 56a of the clamp member 56 is brought into engagement with the lugs 64 of the fuel supply port portion 52, and then the opposite end portion 56b of the clamp member 56 is brought into engagement with the flange portion 51b of the tank body 51, to fix the fuel supply port portion 52 to the tank body 51. The assembly of the fuel tank 21 is now over.

Thus, in the structure shown in FIG. 7, the flange portion 51b is formed on the tank body 51, the flange portion 83 is formed on the cylindrical portion 76 of the pump holder 58, lugs 64 are formed on the filler 53 of the fuel supply port portion 52, the flange portion 83 is interposed between the flange portion 51b and the lugs 64, and the clamp members 56 are engaged with the flange portion 51b and the lugs 64. Therefore, the fixing of the fuel supply port portion 52 to the tank body 51 can be performed easily and speedily, thus making it possible to enhance the productivity.

Further, as shown in FIG. 4, since the fuel supply port portion 52 with the tank fittings assembly 55 integrally incorporated therein is removably attached to the tank body 51 with the clamp member 56, it can be removed and again mounted easily for the maintenance of the fuel pump 57 and the residual fuel meter unit 61.

Figure 8:
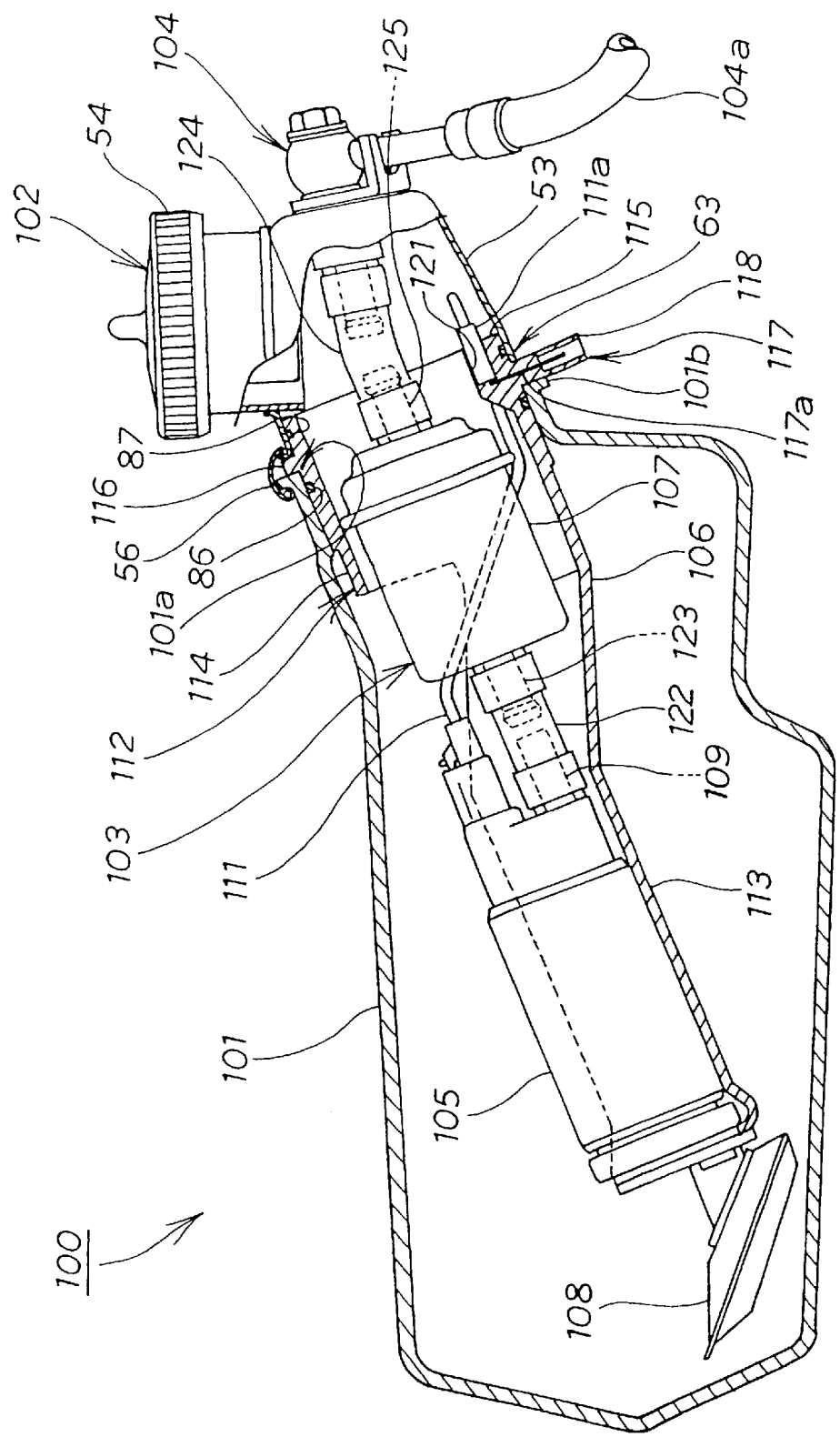
FIG. 8 is a sectional view of a fuel tank structure according to a second embodiment of the present invention.

FIG. 8 is a sectional view of a fuel tank structure according to a second embodiment of the present invention. In this embodiment, the same portions as in the first embodiment described above are identified by the same reference numerals as in the first embodiment and detailed explanations thereof will here be omitted.

A fuel tank 100 comprises a resinous tank body 101 and a fuel supply port portion 102 attached to the tank body 101. The fuel supply port portion 102 is provided with a tank fittings assembly 103 which is inserted nearly wholly into the tank body 101, and it is fixed to the tank body 101 with a plurality of clamp members 56, only one being shown. The tank body 101, which is fabricated by blow molding, is of a simple structure free of any such mounting portions as in the prior art for tank fittings, e.g., fuel supply port, residual fuel meter unit, fuel pipe, and vent pipe. The tank body 101 is provided with an opening 101a for insertion therein of the tank fittings assembly 103 and is also provided with a flange portion 101b formed on an edge portion of the opening 101a.

The fuel supply port portion 102 is provided with a filler 53, a filler cap 54 which closes an opening of the filler 53, and a discharge path. relay portion 104 attached to the filler 53 for relaying a fuel discharge path. Numeral 104a denotes a fuel tube for feeding fuel to a fuel injection valve attached to each cylinder of the engine. The tank fittings assembly 103 comprises a fuel pump 105, a pump holder 106 for fixing the fuel pump 105 to the tank body 101, and a fuel filter 107 interposed between the fuel pump 105 and the discharge path relay portion 104. Numeral 108 denotes a fuel suction port attached to the fuel pump 105. The fuel pump 105 is a motor-operated pump and is provided with a discharge port 109 through which the fuel sucked in from the fuel suction port 108 is fed to the fuel filter 107, and is also provided with a wiring harness 111 which receives electric power from the exterior. Numeral 11 la denotes a connector attached to an end portion of the wiring harness 111. The pump holder 106 comprises a cylindrical portion 112 and a pump support portion 113 extending from the cylindrical portion 112.

The cylindrical portion 112 comprises a tank body-side inserting portion 114 for insertion into the opening 101a of the tank body 101, a fuel supply port-side inserting portion 115 for insertion into an opening 63 of the fuel supply port portion 102, a flange portion 116 formed between the tank body-side inserting portion 114 and the fuel supply port-side inserting portion 115, and a connector portion 117 provided at a lower position. The connector portion 117 comprises an input-side connector 118 provided on an outer periphery side of the cylindrical portion 112 and an output-side connector 121 provided on an inner periphery side of the cylindrical portion 112. The input-side and output-side connectors 118, 121 are brought into electric conduction with each other through a connecting terminal 117a. The fuel filter 107 is provided with an inlet pipe 123 which is connected to the discharge port 109 of the fuel pump 105 through an upstream-side connecting tube 122, and is also provided with an outlet pipe 125 which is connected to the discharge path relaying portion 104 through a downstream-side connecting tube 124.

Thus, the fuel tank 100 according to the present invention is characterized in that the fuel supply port portion 102 with tank fittings integrally incorporated therein, such as the fuel pump 105 and the fuel filter 107, is constituted as a separate member from the tank body 101 and is removably attached to the tank body.

Figure 9:
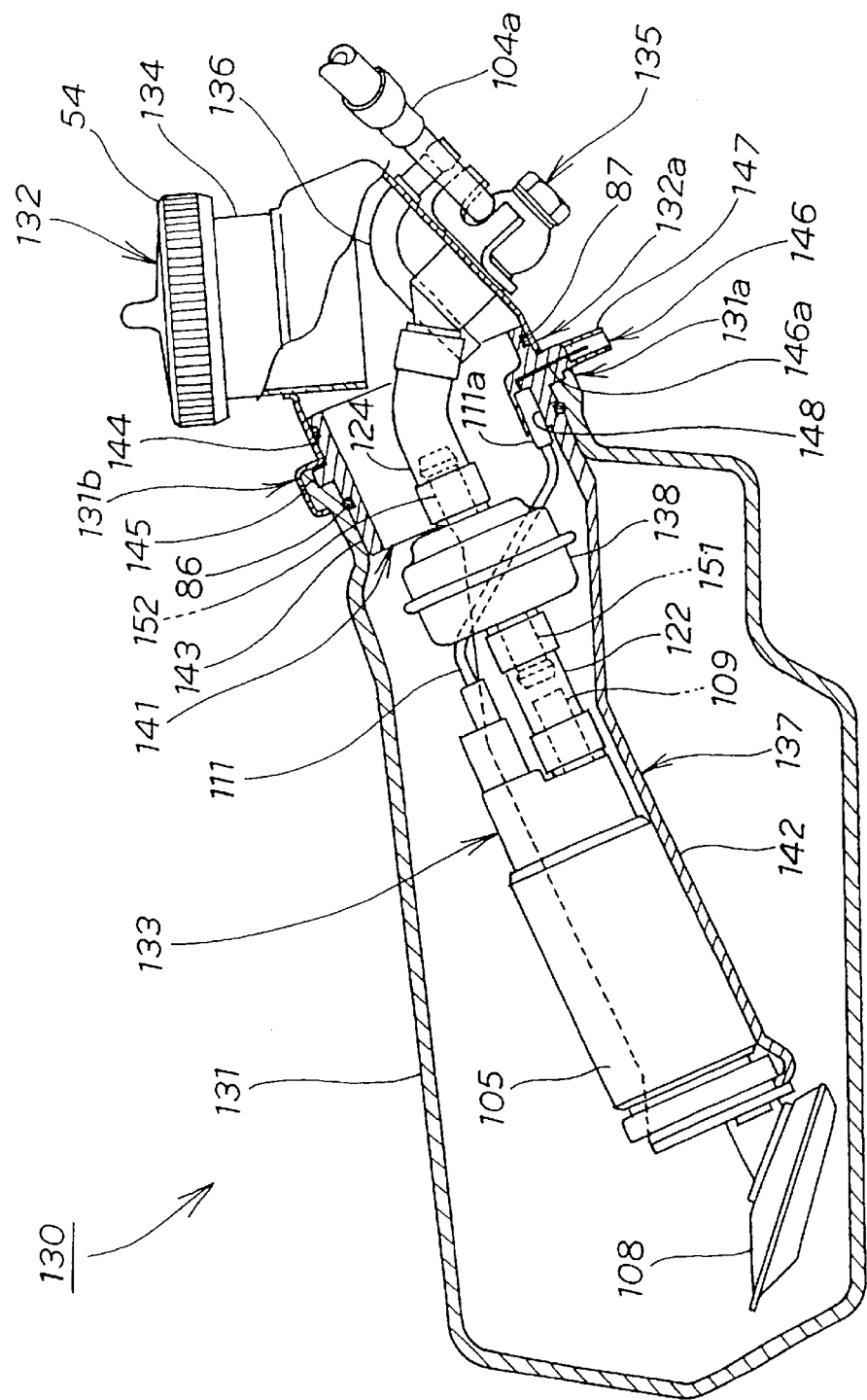
FIG. 9 is a sectional view of a fuel tank structure according to a third embodiment of the present invention.

FIG. 9 is a sectional view of a fuel tank structure according to a third embodiment of the present invention. The third embodiment will be described below with reference to FIGS. 9 to 11. In this embodiment, the same portions as in the first and second embodiments described above are identified by the same reference numerals as in those previous embodiments and detailed explanations thereof will be omitted.

The fuel tank of this third embodiment, indicated at 130, comprises a resinous tank body 131 and a fuel supply port portion 132 attached to the tank body 131. The fuel supply port portion 132 is provided with a tank fittings assembly 133 which is inserted nearly wholly into the tank body 131, and it is combined with the tank body 131. The tank body 131 is a tank of a simple structure fabricated by blow molding and is provided with an opening 131a for insertion therein of the tank fittings assembly 133 and is also provided with a coupling portion 131b formed on an outer peripheral surface of the opening 131a.

The fuel supply port portion 132 is provided with a filler 134, a filler cap 54 which closes an opening of the filler 134, a discharge path relaying portion 135 attached to the filler 134 for relaying a fuel discharge path, and a fuel return pipe 136 secured to the filler 134 for the return of fuel to the fuel tank 130 from the engine side. The tank fittings assembly 133 comprises a fuel pump 105, a pump holder 137 for fixing the fuel pump 105 to the tank body 131, and a fuel filter 138 interposed between the pump holder 137 and the discharge path relaying portion 135. The pump holder 137 comprises a cylindrical portion 141 and a pump support portion 142 extending from the cylindrical portion 141.

The cylindrical portion 141 comprises a tank body-side inserting portion 143 for insertion into the opening 131a of the tank body 131, a fuel supply port-side inserting portion 144 for insertion into an opening 132a of the fuel supply port portion 132, a flange portion 145 formed between the tank body-side inserting portion 143 and the fuel supply port-side inserting portion 144, and a connector portion 146 provided at a lower position.

The connector portion 146 comprises an input-side connector 147 provided on an outer periphery side of the cylindrical portion 141 and an output-side connector 148 provided on an inner periphery side of the cylindrical portion 141, the input-side and output-side connectors 147, 148 being brought into electric conduction with each other through a connecting terminal 146a. The fuel filter 138 is provided with an inlet pipe 151 connected to the discharge port 109 of the fuel pump 105 through an upstream-side connecting tube 122 and an outlet pipe 152 connected to the discharge path relaying portion 135 of the fuel supply port portion 132 through a downstream-side connecting tube 124.

Figure 10:
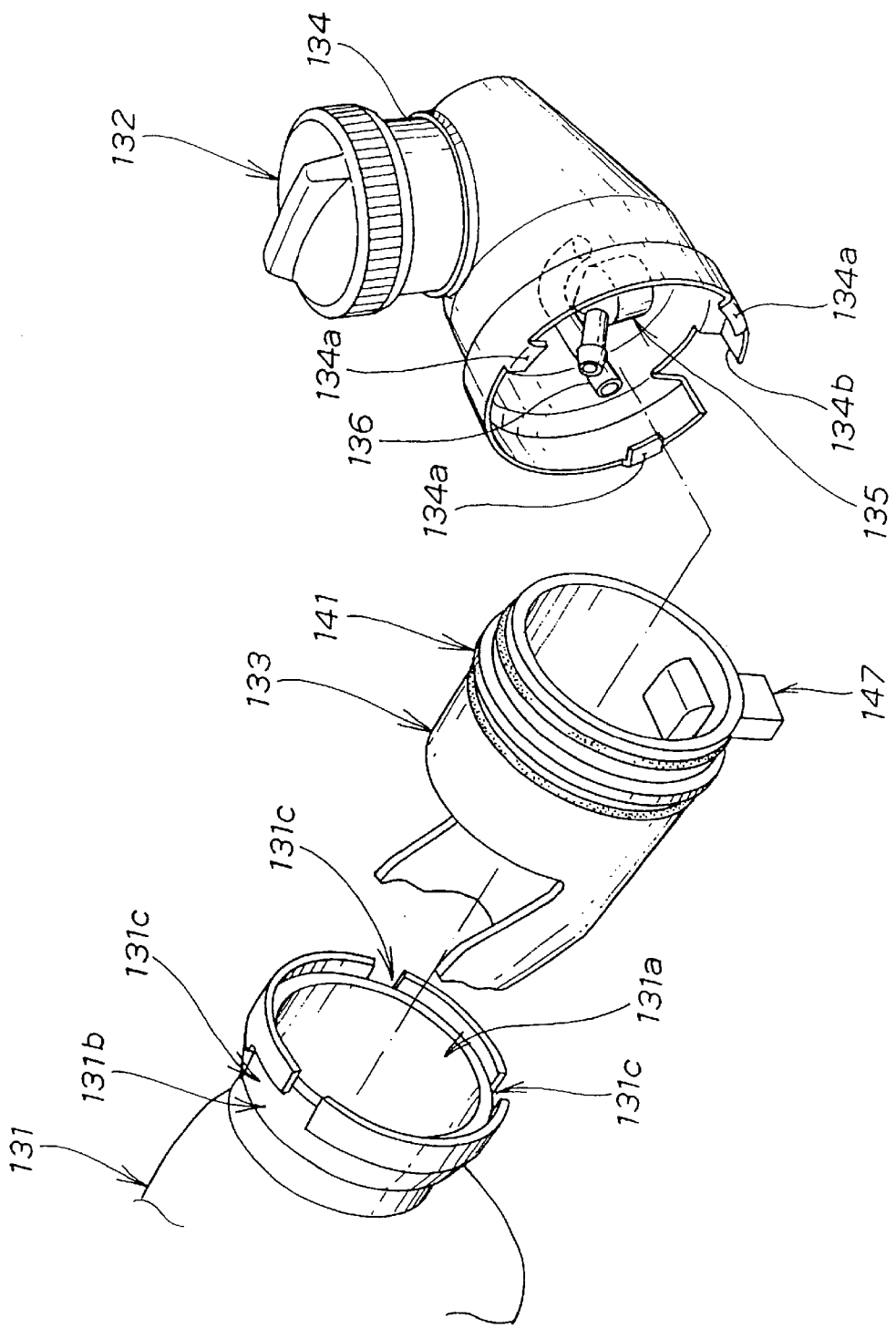
FIG. 10 is a perspective view illustrating a principal portion of the fuel tank structure of the third embodiment.

FIG. 10 is a perspective view explaining a principal portion of the fuel tank structure of the third embodiment. The coupling portion 131b of the tank body 131 is provided with L-shaped hook-like slots 131c, while the filler 134 of the fuel supply port portion 132 is provided with pawl portions 134a for engagement respectively with the hook-like slots 131c of the tank body 131. The numeral 134b denotes a cutout portion formed in the filler 134 for avoiding interference with the input-side connector 147 of the tank fittings assembly 133 at the time of mounting the fuel supply port portion 132 to the tank body 131.

Figure 11A:
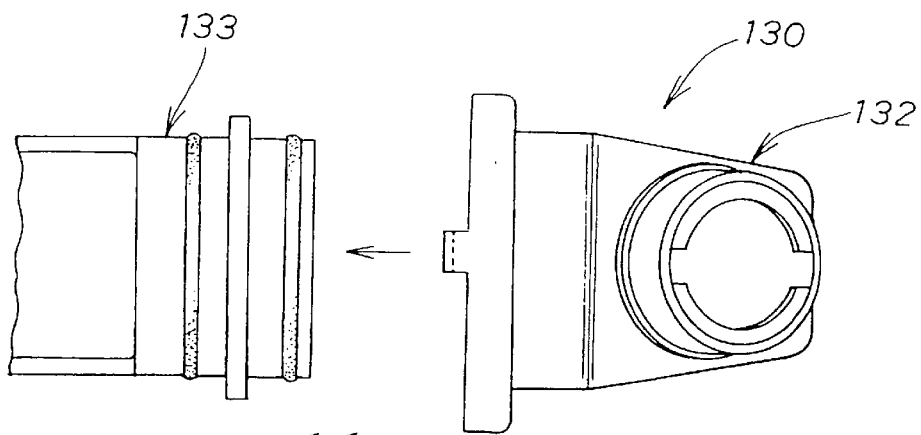
FIG. 11 is a plan view illustrating how to assemble the fuel tank structure of the third embodiment.
Figure 11B:
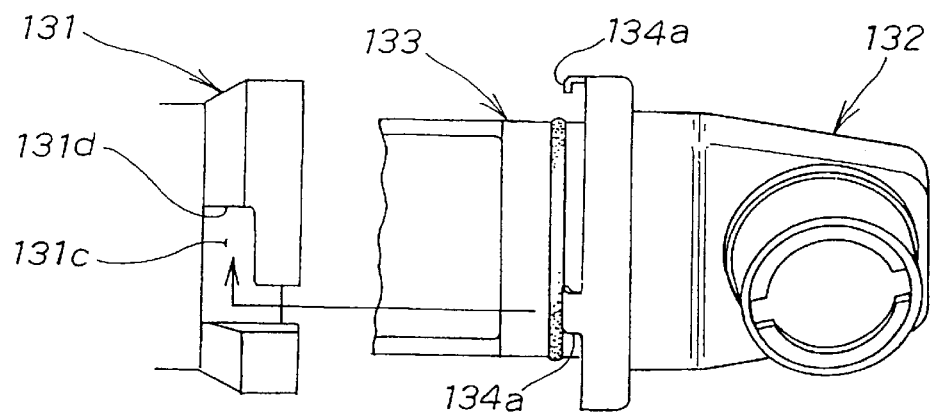
Figure 11C:
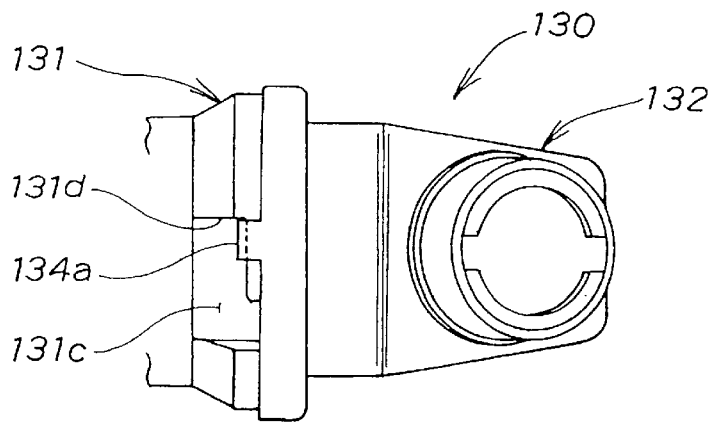

The following description is now provided about how to assemble the fuel tank 130 constructed as above, with reference to FIGS. 11(a) to (c). In FIG. 11(a), the filler 134 (see FIG. 9) of the fuel supply port portion 132 is fitted in the tank fittings assembly 133 after completion of the assembly. At this time, the downstream-side connecting tube 124 is connected to the discharge path relaying portion 135 shown in FIG. 9. In FIG. 11(b), the pawl portions 134a of the fuel supply port portion 132 are respectively fitted in the hook-like slots 131c of the tank body 131. Then, the fuel supply port portion 132 is turned until abutment of the pawl portions 134a against side walls 131d of the hook-like slots 131c. Now, as shown in FIG. 11(c), the fuel supply port portion 132 is coupled to the tank body 131 and the assembly of the fuel tank 130 is completed.

Thus, the fuel tank 130 according to the present invention is characterized in that the fuel supply port portion 132 integrally incorporating such tank fittings as the fuel pump 105 and the fuel filter 138 therein is formed as a separate member from the tank body 131 and is removably attached to the tank body 131.

As described above with reference to FIGS. 9 to 11, since the L-shaped hook-like slots 131c are formed in the tank body 131 and the pawl portions 134a are formed on the fuel supply port portion 132 side for engagement with the hook-like slots 131c, the tank body 131 and the fuel supply port portion 132 can be coupled together easily by inserting the pawl portions 134a into the hook-like slots 131c and subsequent turning of the fuel supply port portion 132. Thus, the fuel tank 130 can be assembled in a simple manner. Consequently, not only the manufacturing cost of the fuel tank 130 can be reduced but also the productivity of the fuel tank can be improved.

Figure 12:
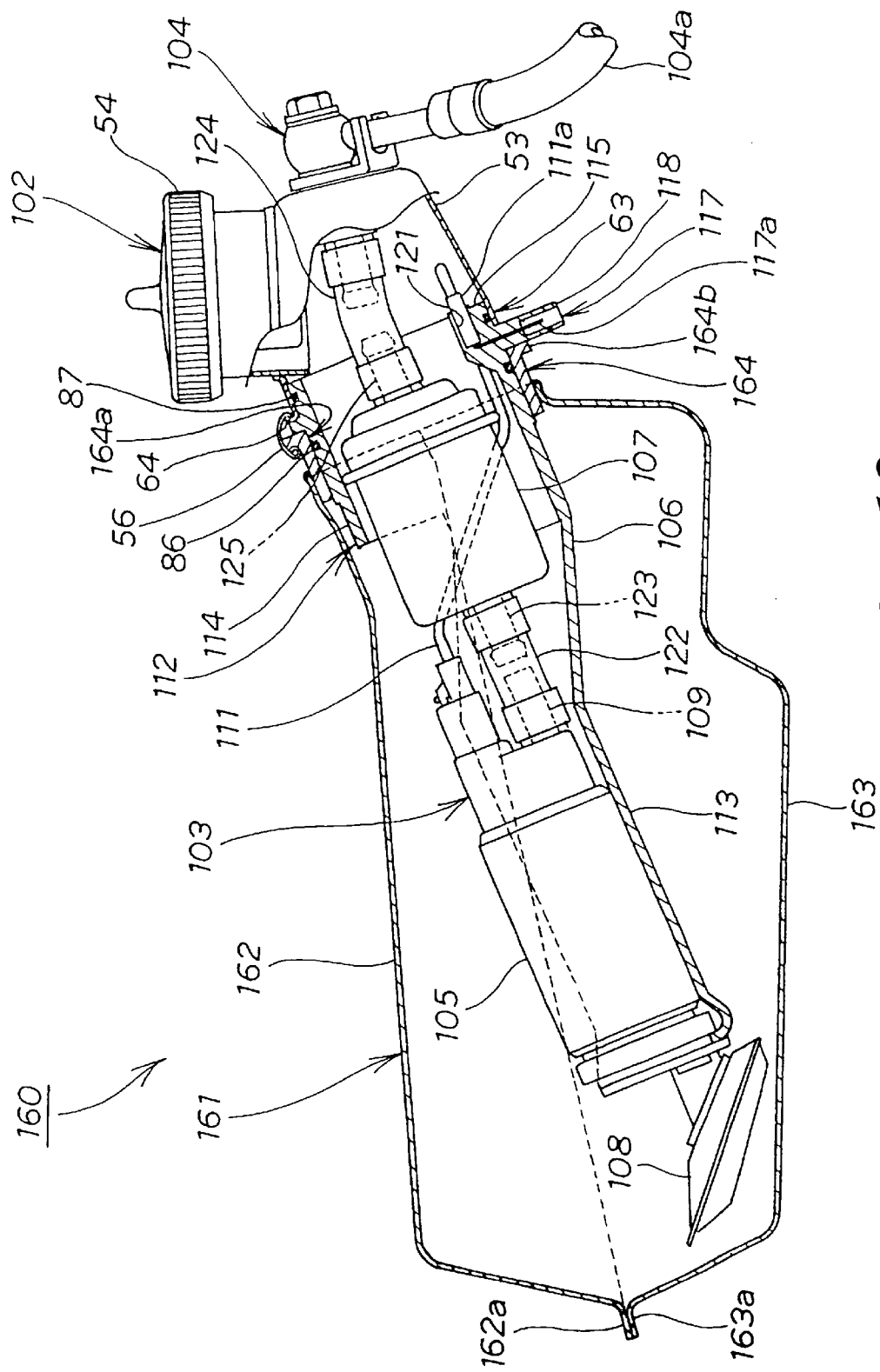
FIG. 12 is a sectional view of a fuel tank structure according to a fourth embodiment of the present invention.

FIG. 12 is a sectional view of a fuel tank structure according to a fourth embodiment of the present invention. In this embodiment, the same portions as in the first to third embodiments are identified by the same reference numerals as in those previous embodiments and detailed explanations thereof will here be omitted.

A fuel tank 160 comprises a tank body 161 constituted by a steel plate, a fuel supply port portion 102 attached to the tank body 161, a tank fittings assembly 103 inserted nearly wholly into the tank body 161, and clamp members 56, only one of which is shown. The tank body 161 is of a simple structure not having any such mounting portions as in the prior art for mounting tank fittings, e.g., fuel supply port, residual fuel meter unit, fuel pipe, and vent pipe. The tank body 161 comprises an upper tank half 162, a lower tank half 163 mounted to a lower portion of the upper tank half 162, and a cylindrical portion 164 attached to both upper and lower tank halves 162, 163. The upper and lower tank halves 162, 163 are provided with flanges 162a and 163a, respectively, which flanges 162a and 163a are joined together by welding for example.

The cylindrical portion 164 is provided with an opening 164a for insertion therein of the tank fittings assembly 103 and a flange portion 164b formed on an edge portion of the opening 164a. At the time of fixing the tank fittings assembly 103 and the fuel supply port portion 102 to the tank body 161, the flange portion 164b, together with lugs 64 of the fuel supply port portion 102, functions as a portion to be engaged with the clamp member 56. Thus, the fuel tank 160 is characterized in that the fuel supply port portion 102 integrally incorporating such tank fittings as the fuel pump 105 and the fuel filter 107 therein is formed as a separate member from the tank body 161 and is removably attached to the tank body 161.

Figure 13:
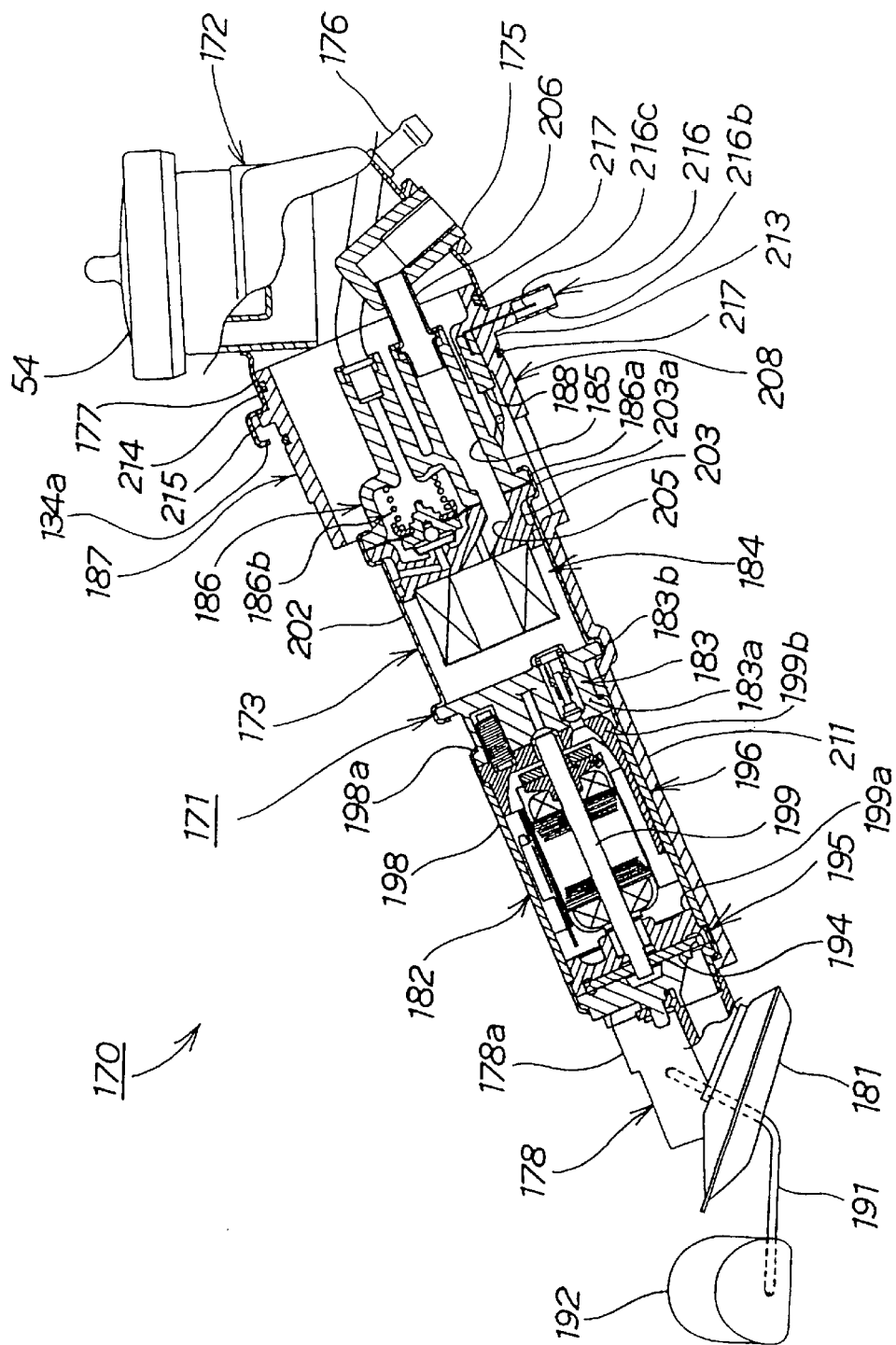
FIG. 13 is a sectional view of a fuel tank structure according to a fifth embodiment of the present invention.

FIG. 13 is a sectional view showing a fuel tank structure according to a fifth embodiment of the present invention. In this embodiment, the same portions as in the first to fourth embodiments are identified by the same reference numerals as in those previous embodiments and detailed explanations thereof will here be omitted.

A fuel tank 170 comprises a tank body (not shown) and a fuel supply port portion 171 attached to the tank body removably. The fuel supply port portion 171 is provided with a filler 172, a filler cap 54 which closes a mouth of the filler 172, and a tank fittings assembly 173 which is inserted substantially wholly into the tank body. The filler 172 is provided with a discharge port 175 for the discharge of fuel to the exterior of the fuel tank 170 and a communication pipe 176 for affording a fuel pressure as a predetermined difference pressure in response to a pressure variation (pulsation) in an intake pipe of an engine. On an opening side of the filler 172 are provided a filler-side cylindrical portion 177 and a plurality of pawl portions 134a projecting from an open end of the filler.

The tank body is provided on an open side thereof with a tank-side cylindrical portion, which has a coupling portion (e.g., the coupling portion 131b shown in FIG. 10) for removably coupling with the pawl portions 134a. The tank fittings assembly 173 comprises a residual fuel meter unit 178, a suction port 181, a fuel pump 182 connected to the suction port 181, a check valve 183 disposed on a discharge side of the fuel pump 182, a fuel filter 184 disposed on a downstream side of the check valve 183, a communication passage 185 which communicates with a discharge side of the fuel filter 184, a pressure regulator 186 for regulating the pressure of fuel to be fed to the engine side, and a tank fittings holder 187 for holding the residual fuel meter unit 178, suction port 181, fuel pump 182, check valve 183, fuel filter 184, and pressure regulator 186. Numeral 188 denotes an output terminal which functions to obtain electric power from the exterior for the residual fuel meter unit 178 and fuel pump 182 or output a residual fuel quantity signal from the residual fuel meter unit 178.

The residual fuel meter unit 178 is provided with a float 192 for detecting a residual amount of fuel, the float 192 being attached to a unit body 178a vertically movably through an arm 191. The fuel pump 182 comprises a pump portion 195 provided with an impeller 194 and a motor portion 196 for driving the pump portion 195. An end portion 198a of a pump case 198 of the fuel pump 182 is caulked to a valve case 183a as a constituent of the check valve 183, thereby connecting the check valve 183 integrally to the fuel pump 182. Numeral 199 denotes a pump shaft which also serves as a motor shaft and numerals 199a and 199b denote a pair of pump shaft support portions for supporting the pump shaft 199.

The fuel filter 184 is received into a cylindrical case 202. The fuel filter 184 and the pressure regulator 186 are attached to one open end of the cylindrical case 202, while an opposite open end of the cylindrical case 202 is secured to the check valve 183, whereby the fuel filter 184 and the pressure regulator 186 are integrally connected to the check valve 183. More specifically, a flange 203a formed on a filter base 203 of the fuel filter 184 and a flange 186a formed on the pressure regulator 186 are fixed together by caulking at one open end of the cylindrical case 202, while a flange 183b formed on the valve case 183a of the check valve 183 is fixed by caulking at the opposite open end of the cylindrical case. Further, the cylindrical case 202 also serves as a housing of the fuel filter 184. Numeral 205 denotes a fuel passage formed within the filter base 203.

In the pressure regulator 186, the communication passage 185 is connected to the discharge port 175 through a joint 206, and a regulator valve 186b is connected to the communication pipe 176 of the filler 172. The tank fittings holder 187 comprises a cylindrical portion 208 and a tank fittings support portion 211 extending from the cylindrical portion 208. The cylindrical portion 208 comprises a tank body-side inserting portion 213 for insertion into the opening of the tank body, a filler-side inserting portion 214 for insertion into the filler-side cylindrical portion 177 of the filler 172, a flange portion 215 formed between the tank body-side inserting portion 213 and the filler-side inserting portion 214, and a connector portion 216 formed at a lower position. A pair of components each identified by numeral 217 are O-rings fitted respectively on outer peripheries of the tank body-side inserting portion 213 and the filler-side inserting portion 214.

The tank fittings support portion 211, which is U-shaped in section, supports a lower portion and both side portions of each of the fuel pump 182 and the cylindrical case 202. The connector portion 216 comprises an input-side connector 216a provided on an inner surface of the cylindrical portion 208 and an output-side connector 216b provided on an outer surface of the cylindrical portion 208. The input-side and output-side connectors 216a, 216b are brought into electric conduction with each other through a connecting terminal 216c.

Figure 14A:
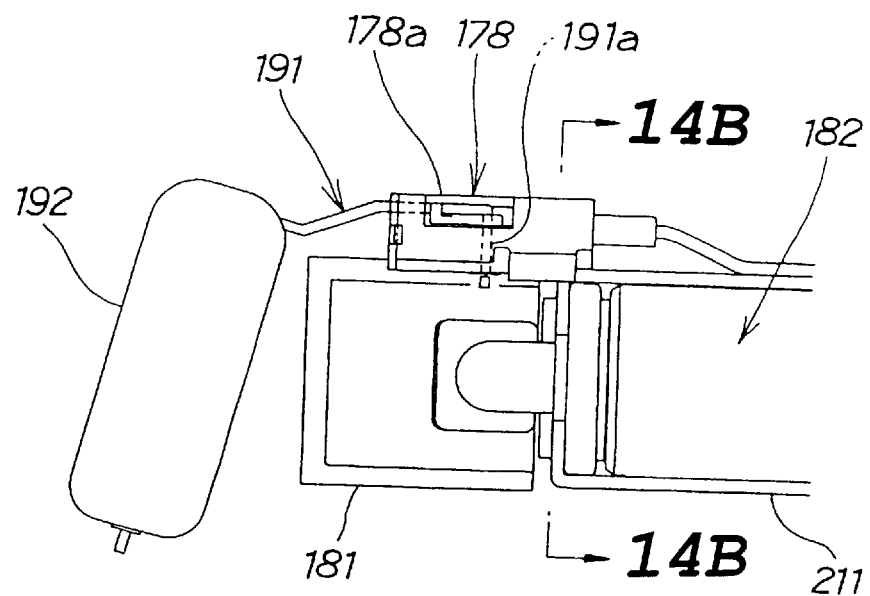
FIG. 14 is an explanatory diagram of a residual fuel meter unit used in the fuel tank structure of the fifth embodiment.
Figure 14B:
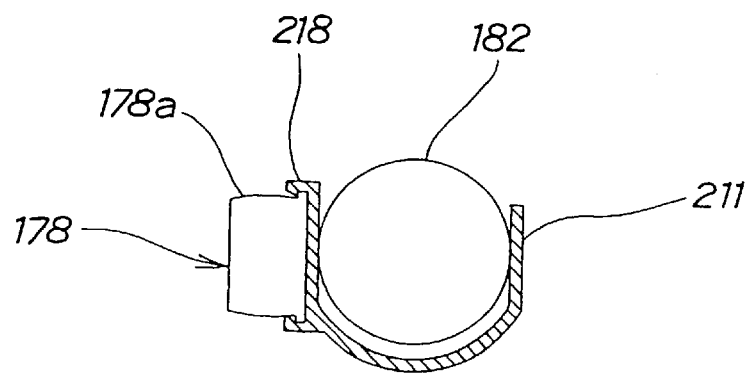

In the residual fuel meter unit 178, as shown in FIG. 14(a), an arm 191, which is L-shaped in plan, is attached swingably to the unit body 178a, and a float 192 is attached to a front end of the arm 191. Numeral 191a denotes a swing shaft portion as a swing shaft of the arm 191. As shown in FIG. 14(b), a residual fuel meter mounting portion 218 is formed sideways of a front end portion of the tank fittings support portion 211 in the tank fittings holder 187 (see FIG. 13), and the residual fuel meter unit 178 is mounted removably to the residual fuel meter mounting portion 218.

Assembly of the fuel tank structure of the fifth embodiment will now be described with reference to FIGS. 15 and 16. First, the residual fuel meter unit 178 and such sub-assembled tank fittings as suction port 181, fuel pump 182, check valve 183, fuel filter 184, and pressure regulator 186 are mounted to the tank fittings holder 187. More specifically, the pressure regulator 186 side of the sub-assembled tank fittings is inserted into the cylindrical portion 208 of the tank fittings holder 187, and the fuel pump 182 and the cylindrical case 202 are fixed to the tank fittings support portion 211. In this case, the fixing is effected by pushing the fuel pump 182 and the cylindrical case 202, whose outside diameter is slightly larger than the size inside both side faces of the tank fittings support portion 211 of the tank fittings holder 187, into the tank fittings support portion 211 which is U-shaped in section. Further, the tank fittings output terminal 188 is connected to the input-side connector 216a of the tank fittings holder 187, and the residual fuel meter unit 178 is attached to the residual fuel meter mounting portion 218 of the tank fittings holder 187.

Figure 15:
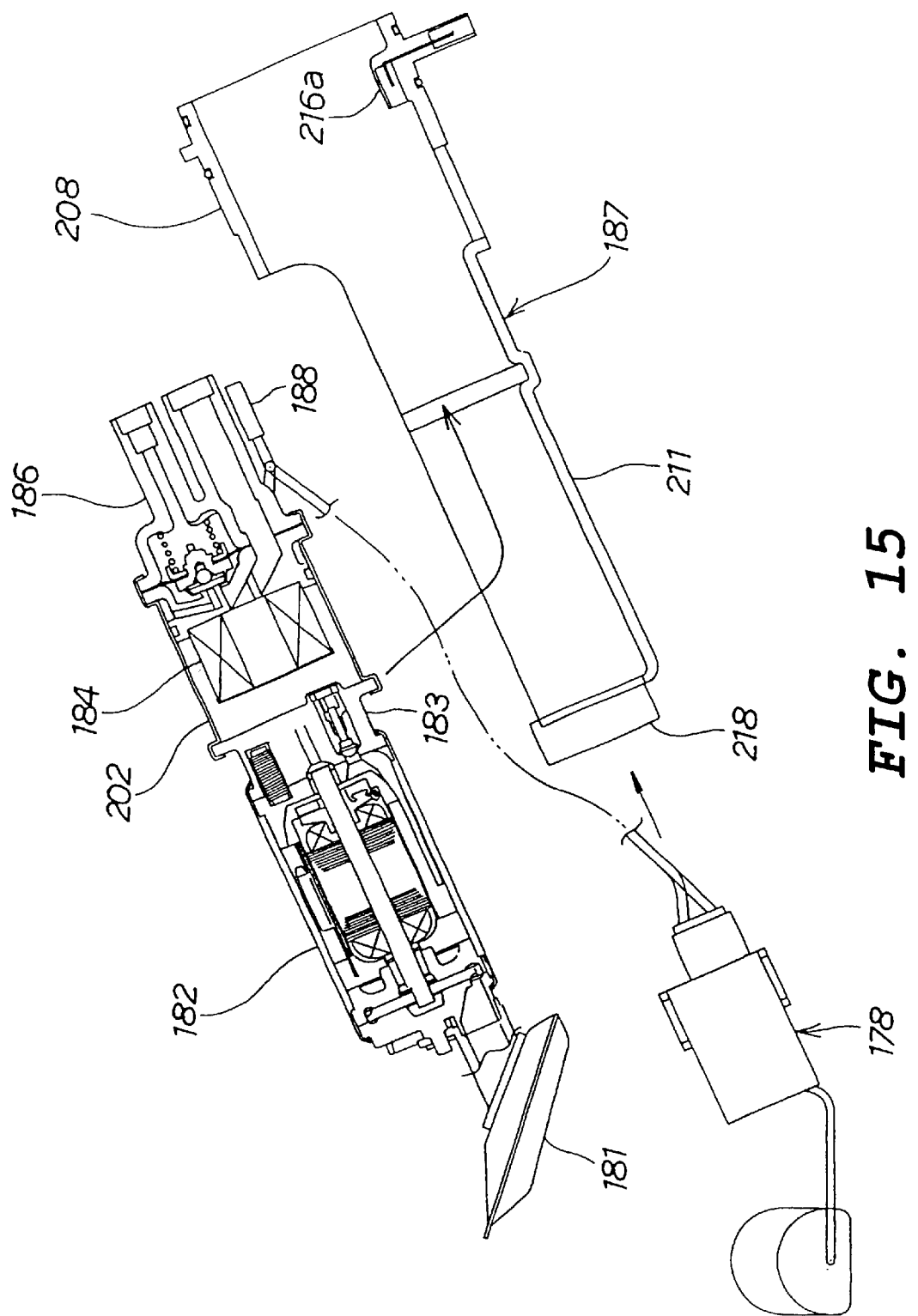
FIG. 15 is a first half of an operational diagram illustrating how to assemble the fuel tank structure of the fifth embodiment.
Figure 16:
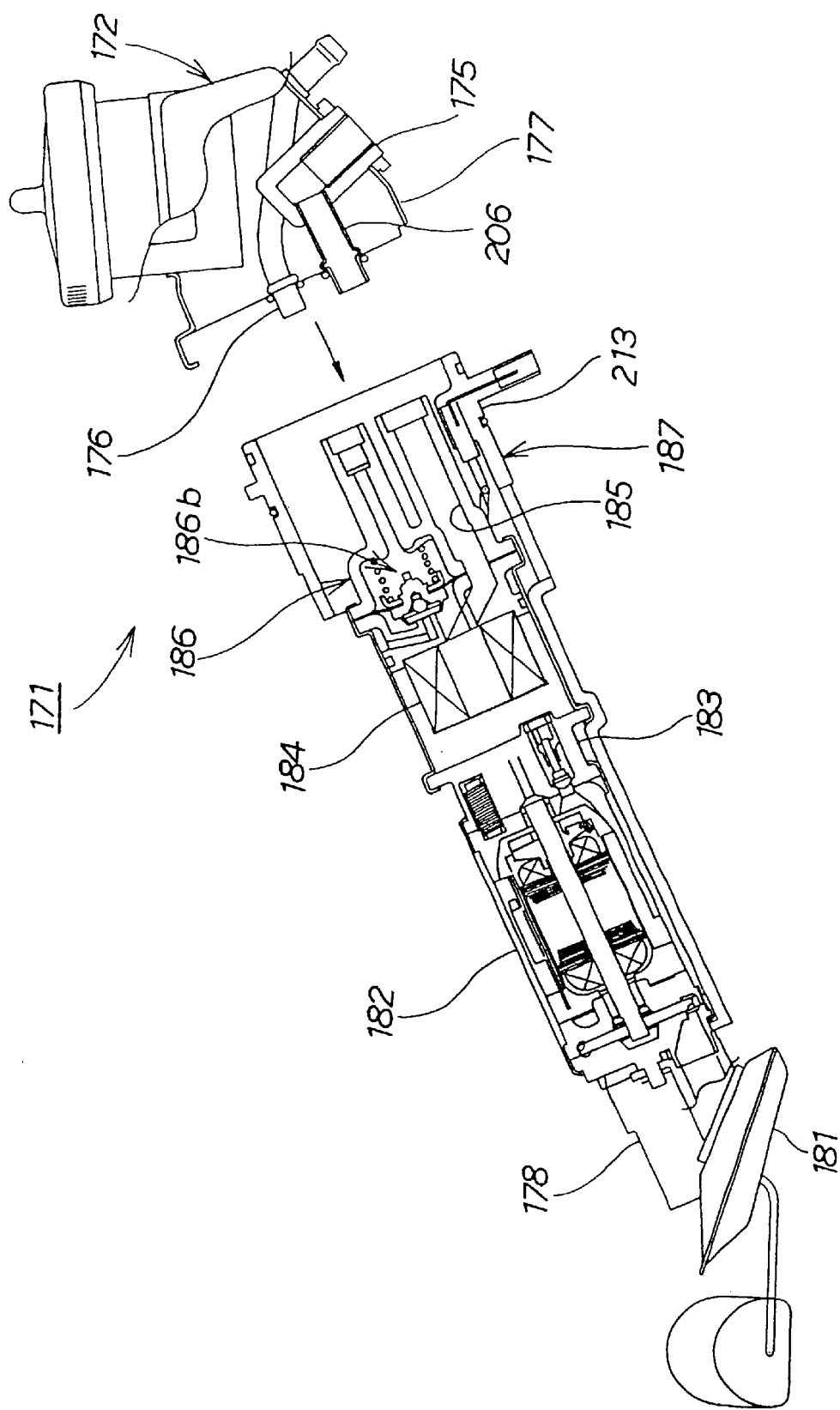
FIG. 16 is a second half of an operational diagram illustrating how to assemble the fuel tank structure of the fifth embodiment.

Referring now to FIG. 16, the discharge port 175 is connected through the joint 206 to the communication passage 185 of the pressure regulator 186 in the tank fittings assembly 173 (see FIG. 13) assembled in FIG. 15, the communication pipe 176 of the filler 172 is connected to the regulator valve 186b in the tank fittings assembly 173, and the filler-side cylindrical portion 177 is fitted on the filler-side inserting portion 213 of the tank fittings holder 187. The assembly of the fuel supply port portion 171 is now over.

As described above in connection with FIG. 13, the present invention is characterized in that the fuel pump 182, the cylindrical case 202 which receives therein the fuel filter 184 disposed on the discharge side of the fuel pump 182, and the cylindrical portion 208 for removably mounting the fuel supply port portion 171 to the tank body, are provided in this order in the fuel supply port portion 171, and that one of the paired pump shaft support portions 199a and 199b for supporting the pump shaft 199 of the fuel pump 182 and one end portion of the cylindrical case 202 are integrally connected with each other through the valve case 183a. Since one of the pump shaft support portions 199a and 199b and one end portion of the cylindrical case 202 are integrally connected with each other, it is possible to assemble the fuel supply port portion 171 easily. Also, a fuel passage can be formed integrally from the pump shaft support portion 199b to the cylindrical case 202 without separately using a conduit such as a hose or the like between the fuel pump 182 and the cylindrical case 202, thus making it possible to reduce the number of components used and also possible to reduce the number of conduit mounting steps and the assembling cost. Further, the distance between the pump shaft support portion 199b and the cylindrical case 202 can be made small, thus permitting an effective utilization of the space concerned, and the fuel supply port portion 171 can be formed compactly in a small size.

The present invention is also characterized in that the pressure regulator 186 for regulating the pressure of fuel to be fed to the engine side is disposed in the fuel supply port portion 171 and that an end portion of the pressure regulator 186 and the opposite end portion of the cylindrical case 202 are integrally connected with each other. Thus, since the opposite end portion of the cylindrical case 202 and an end portion of the pressure regulator 186, which are sub-assembled together, are integrally connected with each other on the pump shaft support portion 199b side, it is possible to effect the assembly of the fuel supply port portion 171 more easily. Also, without separately providing conduits such as hoses or the like for connection of the fuel pump 182, the cylindrical case 202 and the pressure regulator 186, it is possible to form the communication passage 185 and the fuel passage 205 integrally in part of the pump shaft support portion 199b side, cylindrical case 202 and pressure regulator 186, whereby it is possible to reduce the number of components used and the number of conduit mounting steps. Moreover, the distances among the pump shaft support portion 199b, cylindrical case 202, and pressure regulator 186 can be made small, so that it is possible to utilize the space concerned effectively and constitute the fuel supply port portion 171 compactly in a small size.

Further, the fuel pump 182, check valve case 183a, cylindrical case 202, and pressure regulator 186 can be substantially aligned, so that the opening of the tank body into which the fuel supply port portion 171 is inserted can be formed small and hence it is possible to reduce the size of the sealing member for sealing the opening of the tank body. Consequently, not only the material cost of the sealing member can be reduced, but also the sealability for the opening of the tank body can be improved.

The present invention is further characterized in that the communication passage 185 for discharging the fuel to the exterior of the tank body is formed in the pressure regulator 186 integrally by molding. In comparison with the case where the communication passage 185 is provided separately, it is possible to reduce the number of components used and hence reduce the manufacturing cost and mounting cost of the pressure regulator 186.

The present invention is further characterized in that the cylindrical portion 208 as a tank mounting portion is provided, the filler 172 serving as a fuel inlet port of the fuel tank 170 is mounted on one open side of the cylindrical portion 208, a part of the opposite open side is extended to form the tank fittings support portion 211, and the fuel pump 182 is mounted to the tank fittings support portion 211. Since the tank mounting portion is cylindrical, the filler 172 can be mounted easily and it is possible to accommodate tank fittings and form a fuel passage in the interior of the cylinder. By forming the tank fittings support portion 211, it is possible to mount the fuel pump 182 and other tank fittings easily.

The present invention is further characterized in that the filler 172 disposed in the fuel supply port portion 171 is provided with the filler-side cylindrical portion 177, pawls 134a are formed at an open end of the filler-side cylindrical portion 177, a tank-side cylindrical portion is formed on an open side of the tank body which is formed by blow molding, and coupling portions for coupling with the pawl portions 134a removably are formed on the tank-side cylindrical portion. By fitting the filler-side cylindrical portion 177 of the filler 172 onto the tank-side cylindrical portion of the tank body and by bringing the pawl portions 134a of the filler-side cylindrical portion 177 into engagement with the coupling portions formed on the tank-side cylindrical portion, the filler 172 can be coupled to the tank body easily.

Figure 17:
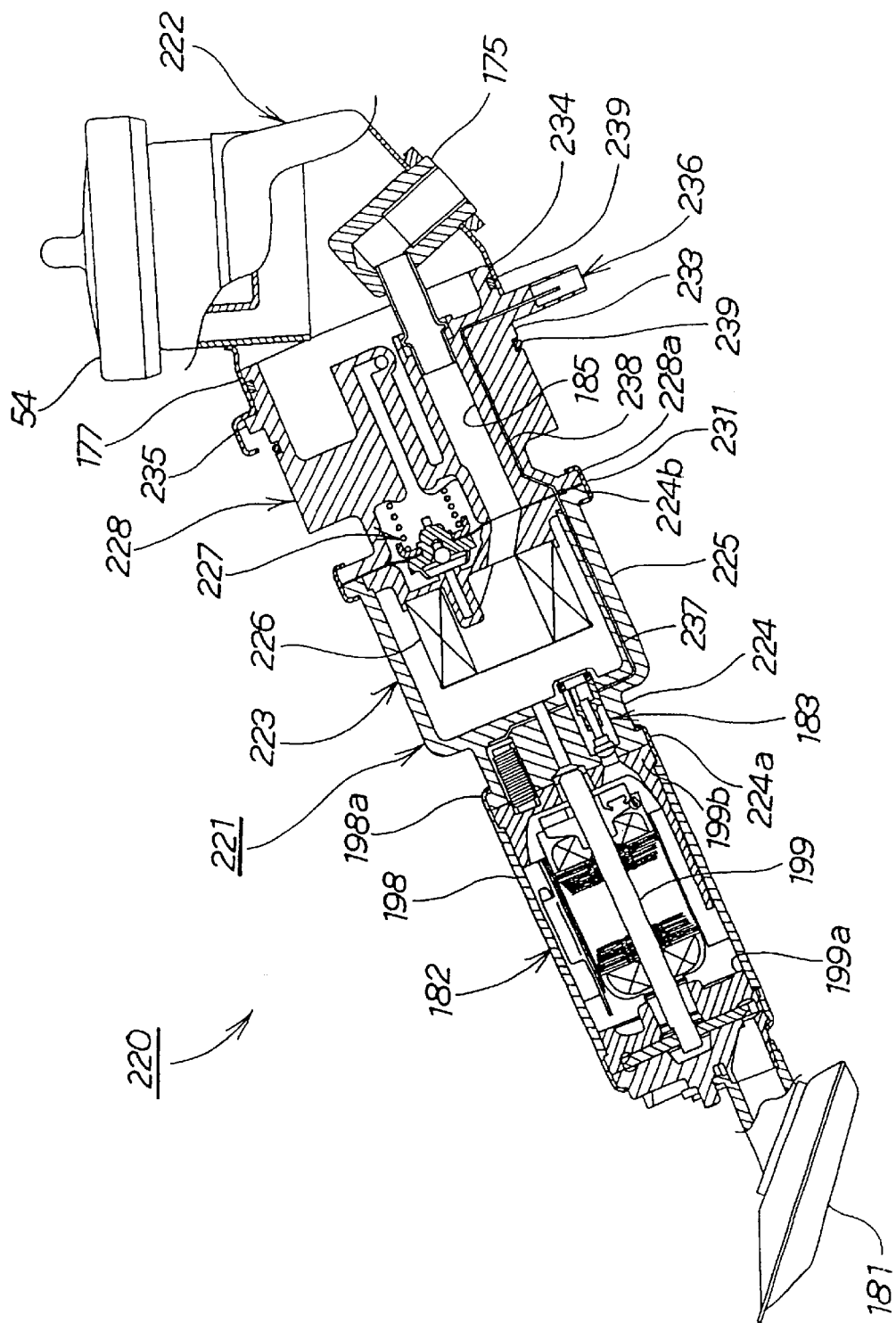
FIG. 17 is a sectional view of a fuel tank structure according to a sixth embodiment of the present invention.

FIG. 17 is a sectional view showing a fuel tank structure according to a sixth embodiment of the present invention. In this embodiment, the same portions as in the first to fifth embodiments are identified by the same reference numerals as in those previous embodiments and detailed explanations thereof will be omitted.

A fuel tank 220 comprises a tank body (not shown) and a fuel supply port portion 221 attached to the tank boy removably. The fuel supply port portion 221 is provided with a filler 222, a filler cap 54 which closes a mouth of the filler 222, and a tank fittings assembly 223 which is inserted substantially wholly into the tank body. The filler 222 is provided with a discharge port 175 for the discharge of fuel to the exterior of the fuel tank 220, with a filler-side cylindrical portion 177 being formed on an open side of the filler 222. The tank fittings assembly 223 comprises a suction port 181, a fuel pump 182 connected to the suction port 181, a check valve 183 disposed on a discharge side of the fuel pump 182, a check valve case 224 for housing the check valve 183 therein, a fuel filter 226 disposed within a housing portion 225 which is formed by molding integrally with the check valve case 224, and a filler connecting portion 228, the filler connecting portion 228 having a communication passage 185 communicating with a discharge side of the fuel filter 226 and also having a pressure regulator valve 227 for regulating the pressure of fuel to be fed to the engine side. The outside of the fuel pump 182 is covered with a pump case 198. The check valve case 224 is attached to an end portion 198a of the pump case 198 and is thereby connected integrally to the fuel pump 182.

The filler connecting portion 228 is secured to an end portion of the housing portion 225 and is thereby connected integrally to the check valve case 224 through the housing portion 225. More specifically, the check valve case 224 has a flange 224a formed at one end portion thereof and a flange 224b formed at an opposite end portion thereof. The filler connecting portion 228 is provided with a flange 228a at an end portion thereof. By caulking the pump case 198 along the flange 224a of the check valve case 224, both fuel pump 182 and check valve case 224 are rendered integral with each other. Likewise, an annular metallic connecting piece 231 is caulked onto both flange 224b of the check valve case 224 and flange 228a of the filler connecting portion 228 to make the check valve case 224 and the filler connecting portion 228 integral with each other. Thus, in the fuel tank 220, the whole of the tank fittings assembly 223 provided with the fuel pump 182, check valve case 224, and filler connecting portion 223 is constituted as an integral body.

The filler connecting portion 228 comprises a tank body-side inserting portion 233 for insertion into the opening of the tank body, a filler-side inserting portion 234 for insertion into the filler-side cylindrical portion 177 of the filler 222, a flange portion 235 formed between the tank body-side inserting portion 233 and the filler-side inserting portion 234, and a connector portion 236 formed at a lower position. Numerals 237 and 238 denote bus bars embedded in the check valve case 224 and the filler connecting portion 228, respectively, for the supply of electric power from the connector portion 236 to the fuel pump 182. The components identified by a pair of reference numerals 239 are O-rings fitted on outer peripheries of the tank body-side inserting portion 233 and the filler-side inserting portions 234, respectively.

As described above with reference to FIG. 17, the present invention is characterized in that the fuel pump 182, the housing portion 225 which houses therein the fuel filter 226 disposed on the discharge side of the fuel pump 182, and the filler connecting portion 228 for mounting the fuel supply port portion 221 to the tank body removably, are provided in this order in the fuel supply port portion 221, and that one of a pair of pump shaft support portions 199a and 199b for supporting a pump shaft 199 of the fuel pump 182 and one end portion of the housing portion 225 are integrally connected with each other. Thus, since one of the pump shaft support portions 199a and 199b and one end portion of the housing portion 225 are integrally connected with each other through the check valve case 224, it is possible to assemble the fuel supply port portion 221 easily. Also, a fuel passage can be formed integrally from the pump shaft support portion 199b to the housing portion 225 without separately using a conduit such as a hose or the like for connection of the fuel pump 182 and the housing portion 225, thereby making it possible to reduce the number of components used and the number of conduit mounting steps. Further, the distance between the pump shaft support portion 199b and the housing portion 225 can be made small and therefore it is possible to utilize the space concerned effectively and constitute the fuel supply port portion 221 compactly in a small size.

Figure 18:
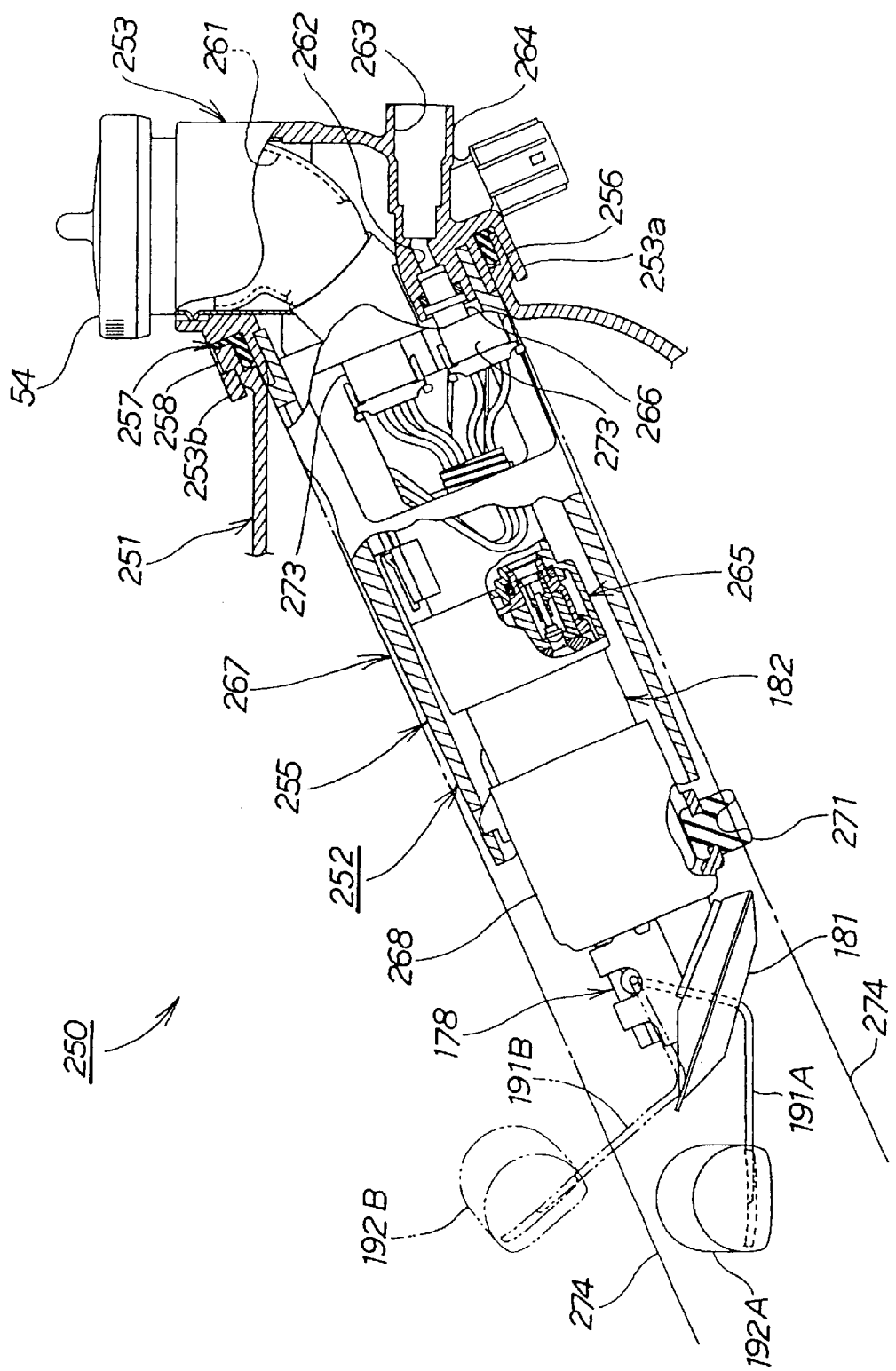
FIG. 18 is a sectional view of a fuel tank structure according to a seventh embodiment of the present invention.

FIG. 18 is a sectional view of a fuel tank structure according to a seventh embodiment of the present invention. In this embodiment, the same portions as in the first to sixth embodiments are identified by the same reference numerals as in those previous embodiments and detailed explanations thereof will be omitted.

A fuel tank 250 comprises a tank body 251 made of resin and a fuel supply port portion 252 attached to the tank body 251 removably. The fuel supply port portion 252 is provided with a filler 253, a filler cap 54 which closes a mouth of the filler 253, and a tank fittings assembly 255 which is inserted substantially wholly into the tank body 251. The tank body 251 is provided with a tank-side cylindrical portion 256 into which is inserted the tank fittings assembly 255. An opening 257 is formed in the tank-side cylindrical portion 256 and a protuberance 258 for engagement with the filler 253 side is formed on an outer surface of the tank-side cylindrical portion 256.

The filler 253 is formed with a filler-side cylindrical portion 253a for mounting to the tank body 251 side and a plurality of receiving portions 253b for engagement with the protuberance 258 formed on the outer surface of the tank-side cylindrical portion 256 are formed at an open end of the filler-side cylindrical portion 253a. Further, the filler 253 is formed with a through inlet hole 261 for pouring fuel into the tank body 251 and a through outlet hole 262 for taking out fuel from the tank body 251 to the engine side. At an outlet of the through outlet hole 262 is formed a pipe inserting hole 263 for connection of a fuel pipe (not shown) which is for the supply of fuel to the engine side. Numeral 264 denotes a wall portion extended so as to enclose an opening portion of the pipe inserting hole 263.

The tank fittings assembly 255 comprises a residual fuel meter unit 178, a fuel suction port 181, a fuel pump 182 connected to the suction port 181, a check valve 265 disposed on a discharge side of the fuel pump 182, a communication pipe 266 communicating with a fuel filter (not shown), which is disposed downstream of the check valve 265, and connected to the through outlet hole 262 of the filler 253, and a tank fittings holder 267 which holds the residual fuel meter unit 178, suction port 181, fuel pump 182, check valve 265, fuel filter, and communication pipe 266.

The numeral 268 denotes a pump holder for mounting the fuel pump 182 to the tank fittings holder 267, numeral 271 denotes a cushion rubber attached to the pump holder 268 for supporting an end portion of the tank fittings assembly 255, a pair of components each identified by numeral 273 are connectors which function to obtain electric power for the residual fuel meter unit 178 and the fuel pump 182 from the exterior and output a residual fuel quantity signal from the residual fuel meter unit 178, and a pair of lines each identified by numeral 274 are extension lines which represent a virtual extension cylinder as an extension of an outer surface of an end portion of the tank fittings holder 267 which end portion is the largest in diameter (i.e., substantially equal to the inside diameter of the opening 257 of the tank body 251).

For the convenience of explanation, arms of the residual fuel meter unit 178 are assumed to be 191A and 191B, floats thereof are assumed to be 192A and 192B, the arm 191A and the float 192A, which are in the lowest position within a vertical movement range, are indicated with a solid line, while the arm 191B and the float 192B, which are in the highest position, are indicated with a phantom line. This embodiment is characterized in that the lowest arm 191A and float 192A are located inside the extension lines 274 which represent a virtual extension cylinder of the tank fittings holder 267.

The fuel tank 250 is assembled in the same way as in FIG. 6. That is, the fuel supply port portion 252 is erected as illustrated, allowing the arm 191A and the float 192A of the residual fuel meter unit 178 to assume the lowest position naturally by virtue of gravity, and the fuel supply port portion 252 is inserted into the opening 257 of the tank body 251. At this time, the arm 191A and the float 192A of the residual fuel meter unit 178 are substantially aligned in the longitudinal direction of the tank fittings holder 267 and are located between the extension lines 274 which represent a virtual extension cylinder of the tank fittings holder 267, so that the arm 191A and the float 192A do not obstruct insertion of the fuel supply port portion into the opening 257 of the tank body 251, nor are they caught in the tank body, thus permitting smooth insertion. Although the cushion rubber 271 projects to the outside of one extension line 274, it can be compressed inside easily because it is flexible, causing no obstacle to the insertion of the fuel supply port portion 252 into the opening 257 of the tank body 251.

As described above with reference to FIG. 18, the present invention is characterized in that the filler 253 serving as a fuel inlet port is provided in the fuel supply port portion 252, the filler-side cylindrical portion 253a is formed in the filler 253, the receiving portion 253b is formed at the open end of the filler-side cylindrical portion 253a, the tank-side cylindrical portion 256 is formed on the open side of the tank body 251 which is formed by blow molding, and the protuberance 258 for removal engagement with the receiving portion 253b is formed on the tank-side cylindrical portion 256.

By fitting the filler-side cylindrical portion 253a of the filler 253 onto the tank-side cylindrical portion 256 of the tank body 251 and by bringing the receiving portion 253b of the filler-side cylindrical portion 253a into engagement with the protuberance 258 of the tank-side cylindrical portion 256, the filler 253 can be coupled to the tank body 251 easily, for example, like coupling the filler 134 to the tank body 131 as shown in FIG. 10.

Figure 19A:
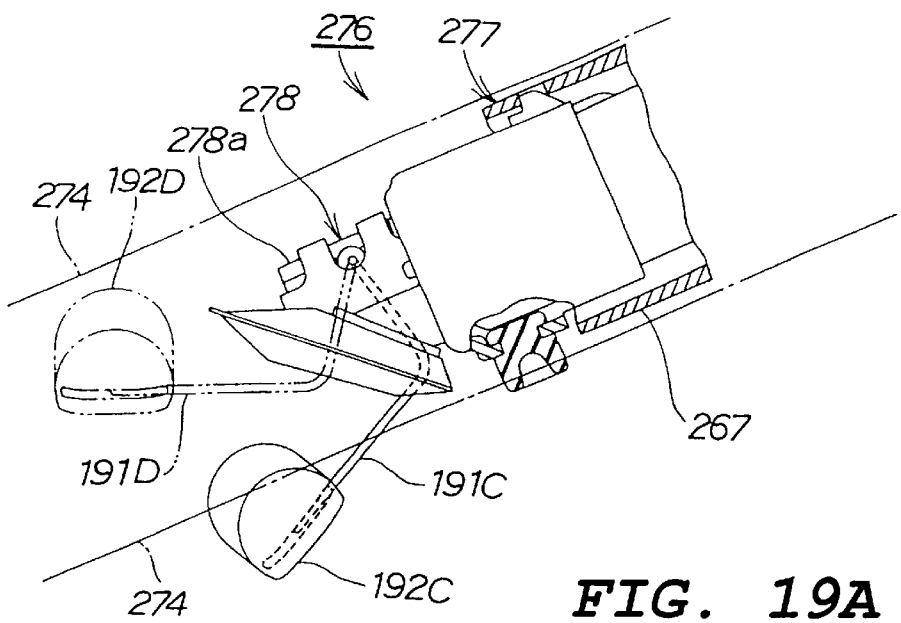
FIG. 19 is an explanatory diagram of a fuel tank structure according to a modification of the seventh embodiment.

FIGS. 19(a) and (b) illustrate a fuel tank structure according to a modification of the seventh embodiment described above, of which (a) is a constructional diagram and (b) is a diagram illustrating operation. In this modification, the same portions as in the first to seventh embodiments are identified by the same reference numerals as in those previous embodiments and detailed explanations thereof will be omitted.

In FIG. 19(a), in a residual fuel meter unit 278 disposed in a fuel supply port portion 277 of a fuel tank 276 (only the residual fuel meter unit is different from the fuel supply port portion 252 in the seventh embodiment), an arm and a float are attached to a unit body 278a swingably for detecting a residual fuel quantity and their highest position within their vertical movement range is located between extension lines 274 which represent a virtual extension cylinder of a tank fittings holder 267.

For the convenience of explanation, arms of the residual fuel meter unit 278 are assumed to be 191C and 191D and floats thereof are assumed to be 192C and 192D, and the arms 191C and float 192C, which are at the lowest position in their vertical movement range, are indicated with a solid line, while the arm 191D and float 192D, which are at the highest position, are indicated with a phantom line.

Figure 19B:
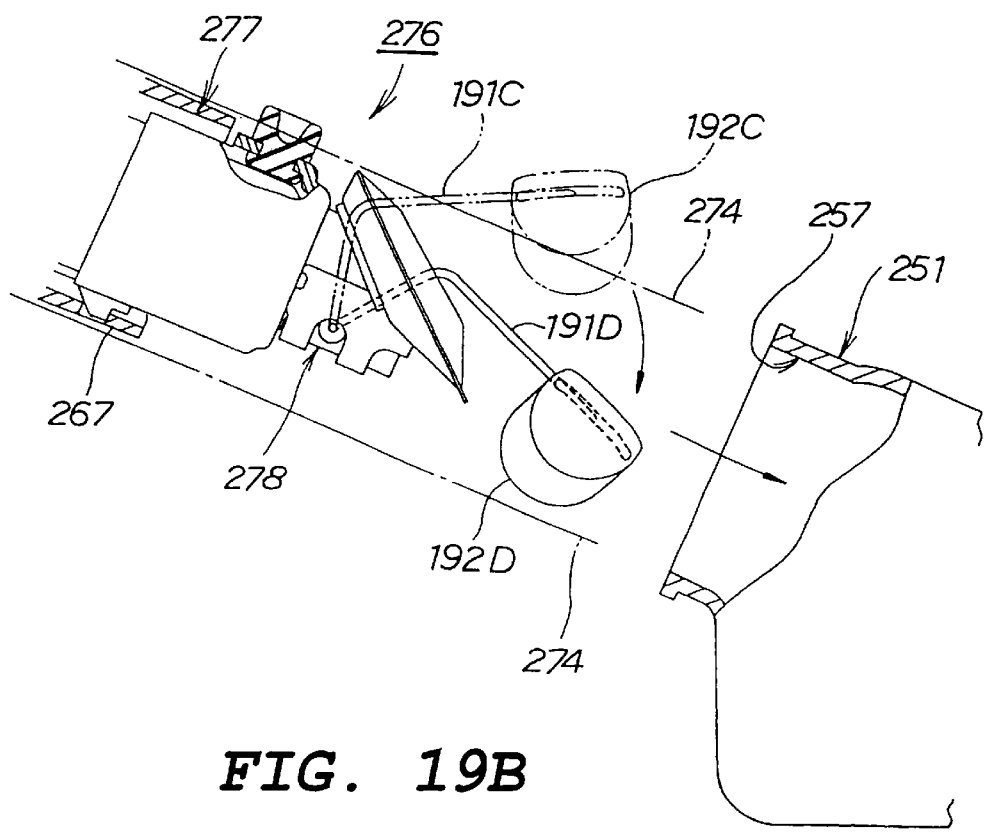

In FIG. 19(b), when assembling the fuel tank 276, the fuel supply port portion 277 is inverted as illustrated (a 180°-turned state of the fuel supply port portion 277 explained in FIG. 19(a) relative to the longitudinal axis thereof), allowing the arm and float of the residual fuel meter unit 278 to assume their highest position in the erected state naturally by virtue of gravity (the lowest position in the illustrated example). That is, with the arm and float held at the positions of arm 191D and float 192D, the fuel supply port portion 277 is inserted into the opening 257 of the tank body 251.

At this time, the arm 191D and float 192D of the residual fuel meter unit 278 are substantially aligned in the longitudinal direction of the tank fittings holder 267 and are located between the extension lines 274 which represent a virtual extension cylinder of the tank fittings holder 267, so that the fuel supply port portion can be inserted into the opening 257 of the tank body 251 smoothly without the arm 191D and float 192D causing an obstacle to the inserting operation or being caught in the tank body.

As described above with reference to FIG. 18, the present invention is characterized in that the tank fittings holder 267 is attached to the fuel supply port portion 252, tank fittings are incorporated into the tank fittings holder 267, the float 192A is provided in the residual fuel meter unit 178 mounted in the fuel supply port portion 252, the float 192A being movable vertically through the arm 191A for detecting a residual fuel quantity, and the position of the float 192A, i.e., the lowest position thereof within its vertical movement range, is set within a virtual extension cylinder as an extension of the outer peripheral surface of the tank fittings holder 267, that is, inside the extension lines 274 which represent the virtual extension cylinder.

Since the position of the float 192A, i.e., the lowest position thereof within its vertical movement range, is set within the virtual extension cylinder as an extension of the outer peripheral surface of the tank fittings holder 267, the float 192A is substantially aligned in the longitudinal direction of the tank fittings holder 267 and in this state the fuel supply port portion 252 is inserted and mounted into the tank body 251. Therefore, the float 192A is not an obstacle when inserting the fuel supply port portion 252 into the tank body 251 and it is possible to assemble the fuel tank 250 smoothly and improve the productivity of the fuel tank.

Further, as described above with reference to FIGS. 19(a) and (b), the present invention is characterized in that the tank fittings holder 267 is installed in the fuel supply port portion 277, tank fittings are mounted into the tank fittings holder 267, the float 192D, which is movable vertically through the arm 191D for detecting a residual fuel quantity, is provided in the residual fuel meter unit 278 installed in the fuel supply port portion 277, and the position of the float 192D, i.e., the highest position thereof in its vertical movement range, is set within a virtual extension cylinder as an extension of the outer peripheral surface of the tank fittings holder 267, that is, inside the extension lines 274 which represent the virtual extension cylinder.

Since the position of the float 192D, i.e., the highest position thereof in its vertical movement range, is set within the virtual extension cylinder as an extension of the outer peripheral surface of the tank fittings holder 267, the float 191D is substantially aligned with the longitudinal direction of the tank fittings holder 267 and in this state the fuel supply port portion 277 is inserted and mounted into the tank body 251. Therefore, the float 192D does not obstruct the insertion of the fuel supply port portion 277 into the tank body 251 and the assembly of the fuel tank 276 can be done smoothly, whereby the productivity of the fuel tank 276 can be improved.

Figure 20:
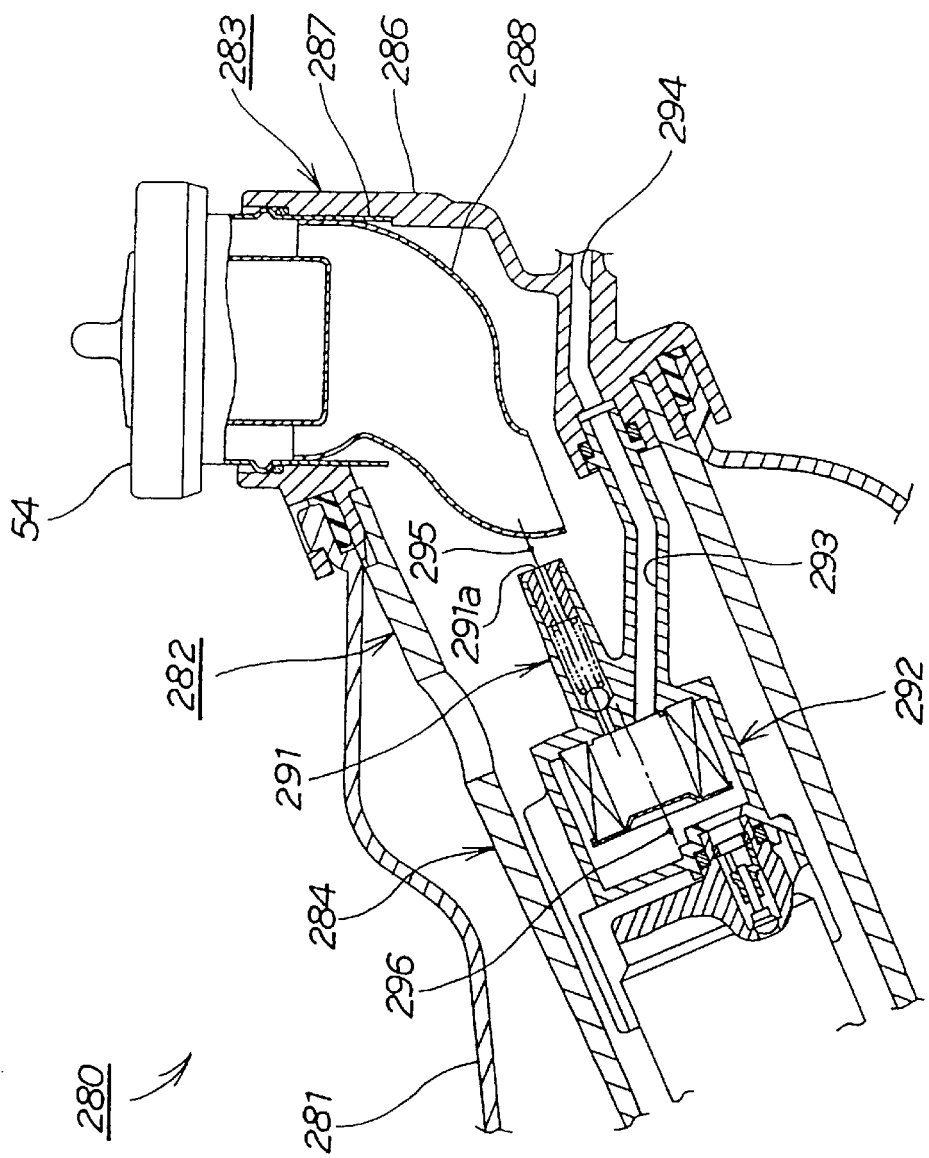
FIG. 20 is a sectional view of a principal portion of a fuel tank structure according to an eighth embodiment of the present invention.

FIG. 20 is a sectional view of a principal portion of a fuel tank structure according to an eighth embodiment of the present invention. In this embodiment, the same portions as in the first to seventh embodiments and the modification of the seventh embodiment are identified by the same reference numerals as in those previous embodiments and modification and detailed explanations thereof will be omitted.

A fuel tank 280 comprises a tank body 281 made of resin and a fuel supply port portion 282 attached to the tank body 281 removably. The fuel supply port portion 282 is provided with a filler 283, a filler cap 54 which closes a mouth of the filler 283, and a tank fittings assembly 284 which is inserted substantially wholly into the tank body 281. The filler 283 comprises a filler body 286 connected to the tank body 281 side, a cylinder 287 for mounting the filler cap 54 to the filler body 286, and a funnel 288 mounted inside the cylinder 287.

Numeral 291 denotes a relief valve formed integrally on an outlet side of a fuel filter 292. The relief valve 291 opens when the pressure of fuel discharged from the fuel tank 280 to the exterior through discharge passages 293 and 294 exceeds a predetermined value, thereby preventing an excess rise of the fuel pressure. Thus, since the relief valve 291 is formed integrally with the fuel filter 292 by molding, it is possible to reduce the number of components used and that of assembling steps and hence possible to reduce the manufacturing cost of the fuel tank 280.

An axis 295 of the relief valve 291 is parallel to an axis 296 of the fuel filter. Therefore, rapping of the die used can be done easily in forming the relief valve 291 integrally with the fuel filter 292 by molding. In the figure, the relief valve 291 is formed so that an outlet 291a thereof faces an outer surface of the funnel 288. Since the outlet 291a of the relief valve 291 is thus allowed to face the outer surface of the funnel 288, a jet of fuel from the outlet 291a strikes against the outer surface of the funnel 288, resulting in that the fuel flowing speed decreases, whereby it is possible to prevent bubbling of the fuel.

Figure 21:
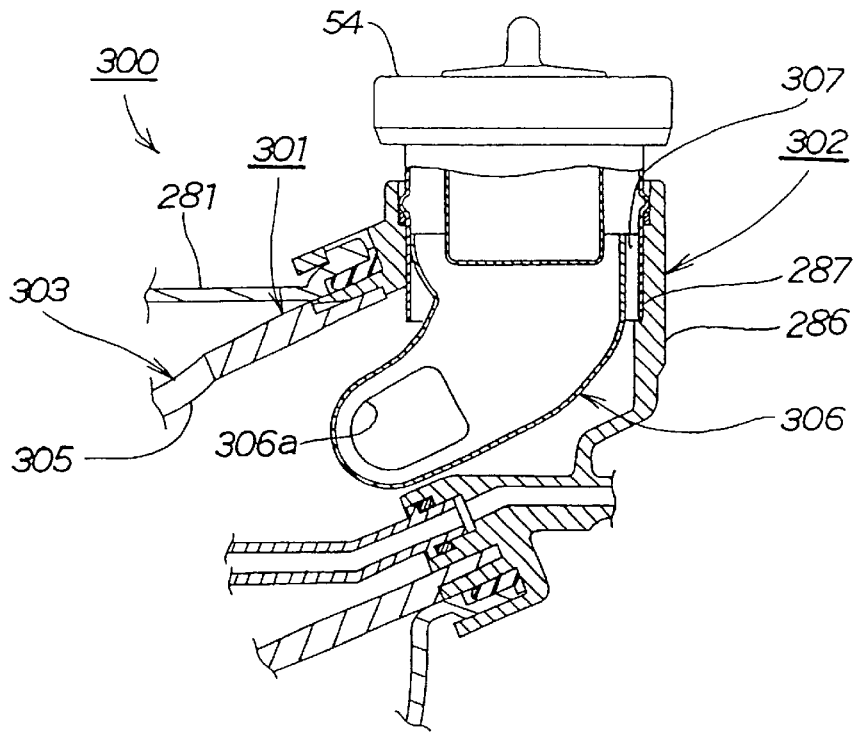
FIG. 21 is a sectional view of a principal portion of a fuel tank structure according to a ninth embodiment of the present invention.

FIG. 21 is a sectional view of a principal portion of a fuel tank structure according to as ninth embodiment of the present invention. In this embodiment, the same portions as in the first to eighth embodiments and the modification of the seventh embodiment are identified by the same reference numerals as in those previous embodiments and detailed explanations thereof will be omitted.

A fuel tank 300 comprises a tank body 281 made of resin and a fuel supply port portion 301 attached to the tank body 281 removably. The fuel supply port portion 301 is provided with a filler 302, a filler cap 54 which closes a mouth of the filler 302, and a tank fittings assembly 303 which is inserted substantially wholly into the tank body 281. Numeral 305 denotes a tank fittings holder which constitutes the tank fittings assembly 303 and which holds tank fittings.

The filler 302 comprises a filler body 286, a cylinder 287, and a funnel 306 mounted inside the cylinder 287. A plurality of air passages 307 are formed between the cylinder 287 and the funnel 306 for passing air therebetween. In the funnel 306, an outlet 306a thereof is allowed to face a through hole (not shown) formed in a wall surface of the tank fittings holder 305 and is directed to an inner surface of the tank body 281. Thus, since the outlet 306a of the funnel 306 is allowed to face the through hole formed in the tank fittings holder 305, fuel which has been poured into the filler 302 from the exterior flows from the outlet 306a of the funnel 306 into the tank body 281 through the through hole formed in the tank fittings holder 305 and then flows smoothly along the inner surface of the tank body 281, so that bubbling of the fuel can be diminished within the tank body 281.

The air passages 307 are formed in the filler 302, so when fuel is introduced from the inlet of the filler 302, the fuel and air mixed therein flow out from the interior of the funnel 306 into the tank body 281. In this case, the mixed air rises along the outer peripheral surface of the funnel 306 without obstructing the flow of the fuel and mixed air in the interior of the funnel 306, then passes through the air passages 307, further passes the inlet side of the filler 302 and is discharged to the exterior. Thus, it is possible to prevent blow-back of the air-fuel mixture at the time of fuel supply.

Figure 22:
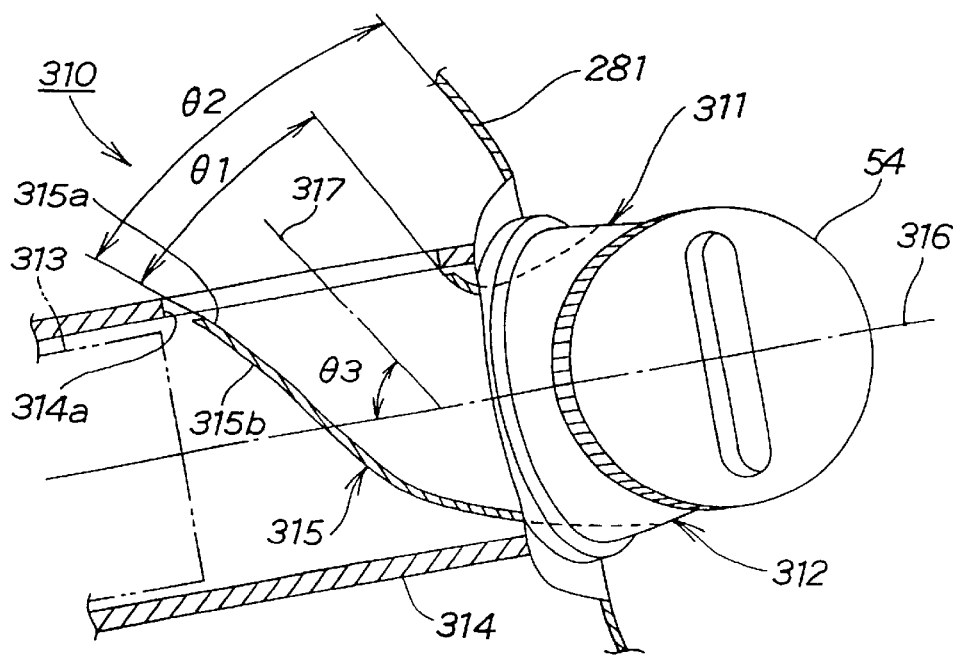
FIG. 22 is a plan view, partially in section, of a principal portion of a fuel tank structure according to a tenth embodiment of the present invention.

FIG. 22 is a plan view (partially in section) of a principal portion of a fuel tank structure according to a tenth embodiment of the present invention. In this embodiment, the same portions as in the first to ninth embodiments and the modification of the seventh embodiment are identified by the same reference numerals as in those previous embodiments and detailed explanations thereof will be omitted.

A fuel tank 310 comprises a tank body 281 and a fuel supply port portion 311 attached to the tank body 281 removably. The fuel supply port portion 311 is provided with a filler 312, a filler cap 54 which closes a mouth of the filler 312, and a tank fittings holder 314 as a cylindrical holder which constitutes a tank fittings assembly and which holds tank fittings 313.

The filler 312 is provided with a guide pipe 315 for conducting fuel into the tank body 281. In the guide pipe 315, a wall surface 315b located near an outlet 315a is formed in a divergent shape at an angle of θ1. With such a divergent shape, the fuel which has been fed from the inlet of the filler 312 decreases its flowing speed at the outlet 315a of the guide pipe 315, whereby bubbling of the fuel can be prevented. Also between the outlet 315a of the guide pipe 315 and an inner surface of the tank body 281 there can be formed such a divergent shape at an angle of θ2.

The outlet 315a of the guide pipe 315 is positioned in an extending direction of a straight line 317 which is inclined at an angle of θ3 relative to an extending direction of a virtual line 316 (the virtual line 316 is substantially coincident with the axis of the tank fittings holder 314), the virtual line 316 connecting the inlet of the filler 312 and the tank fittings 313 with each other. Further, the outlet 315a is allowed to face a through hole 314a formed through a side face portion of the tank fittings holder 314.

Thus, the present invention is characterized in that in the fuel supply port portion 311 there is disposed the guide pipe 315 which conducts the fuel into the tank body 281 during the supply of fuel and which directs the flow of fuel in a direction inclined relative to an extending direction of the virtual line 316, the virtual line 316 joining the inlet of the fuel supply port portion 311 and the tank fittings 313, thereby allowing the fuel to flow while avoiding the tank fittings 313. Since the guide pipe 315 is provided, it is possible to conduct the fuel into the tank body 281 and let it flow so as to avoid the tank fittings 313 during the supply of fuel, thus making it possible to smooth the flow of fuel and prevent bubbling of the fuel.

The present invention is also characterized in that the tank fittings holder 314 is mounted to the fuel supply port portion 311, the tank fittings 313 are mounted within the tank fittings holder 314, the outlet 315a of the guide pipe 315 is allowed to face the inner surface of the tank fittings holder 314 located between the fuel supply port portion 311 and the tank fittings 313, and the through holes 314a is formed in the side face portion of the tank fittings holder 314 adjacent to the outlet 315a. In the fuel tank with tank fittings 313 incorporated in the tank fittings holder 314, by allowing the outlet 315a of the guide pipe 315 to face the through hole 314a formed in the side face potion of the tank fittings holder 314, it is possible to let the fuel flow smoothly from the outlet 315a of the guide pipe into the tank body 281 through the through hole 314a formed in the tank fittings holder 314 during the supply of fuel, whereby it is possible to prevent bubbling of the fuel. Also, since the fuel does not flow to the tank fittings 313 side, the fuel flow is not obstructed by the tank fittings 313, thus also contributing to the prevention of fuel bubbling.

An example of apparatus and method for manufacturing the above resinous tank bodies 51, 101, 131, 251, and 281 will be described below with reference to FIGS. 23 to 25. In the following description, the tank bodies will be represented by the tank body 51.

Figure 23:
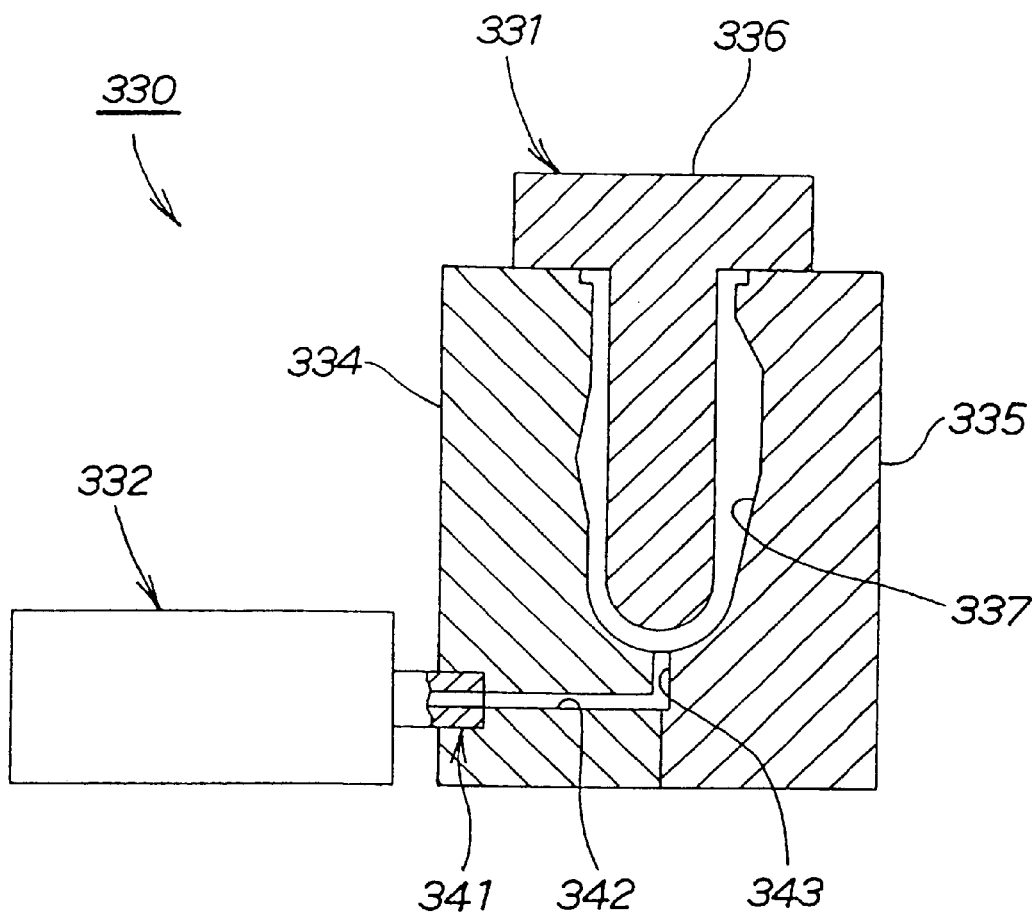
FIG. 23 is an explanatory diagram illustrating a manufacturing apparatus for a tank body of a fuel tank structure according to the present invention.

FIG. 23 is an explanatory diagram illustrating an apparatus for manufacturing a tank body of a fuel tank structure according to the present invention, which apparatus is an injection molding apparatus for producing a preform (parison) as a basic form of the tank body. The injection molding apparatus, indicated at 330, comprises a mold 331 for injection molding and an injection molding machine 332 for injecting a thermoplastic resin in a heat-melted state into the mold 331. The mold 331 for injection molding comprises a first cavity mold 334, a second cavity mold 335, and a core mold 336, with a parison forming cavity 337 being defined by the first and second cavity molds 334, 335 and the core mold 336. Numeral 341 denotes an injection molding machine connecting portion, numeral 342 denotes a runner, and numeral 343 denotes a gate.

The injection molding machine 332 is provided with a plasticizing mechanism for heat-melting a resin material, an injection mechanism for injection of the thus-melted resin, a mold clamping mechanism for holding, opening/closing and clamping a mold, a drive mechanism for driving those mechanisms, and a control unit for controlling the operation of each mechanism.

Figure 24A:
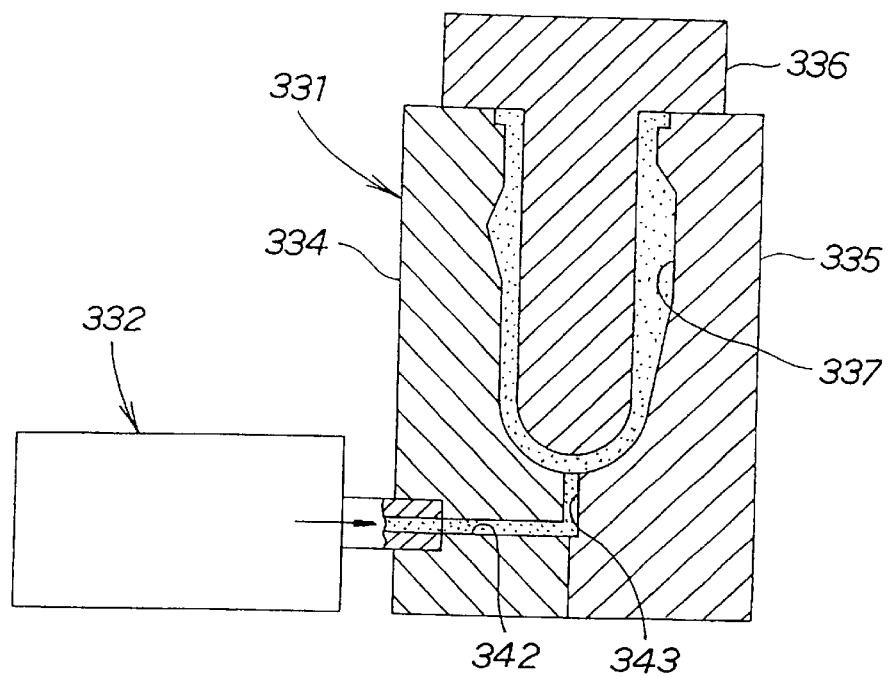
FIG. 24 is a first half of an operational diagram illustrating a method for manufacturing a tank body of a fuel tank structure.
Figure 24B:
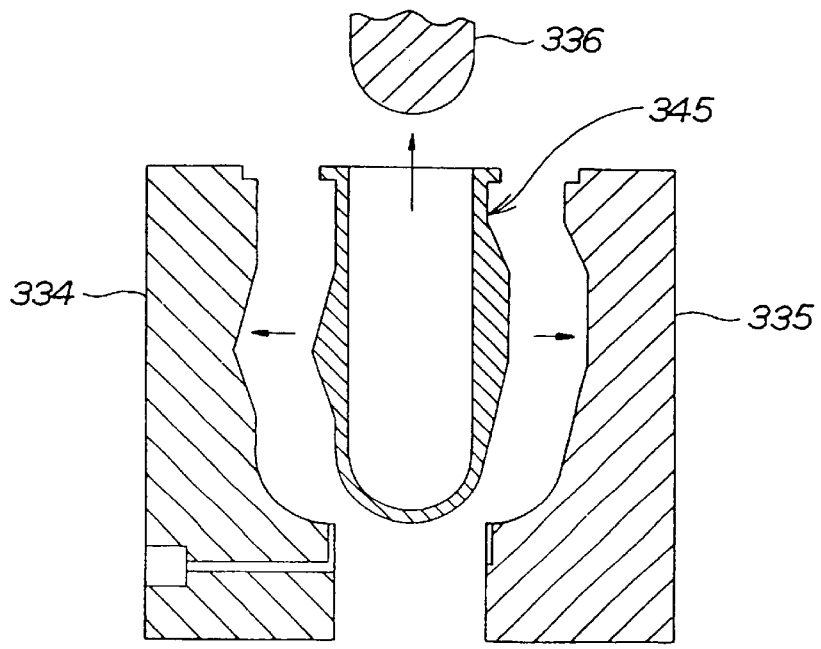

As shown in FIG. 24(a), a heat-melted resin is injected into the cavity 337 from the injection molding machine 332 through the runner 342 and gate 343. As shown in FIG. 24(b), after solidifying of the resin in the cavity 337, the molds 334, 335, and 336 are opened and a cup-like parison 345 is taken out. The parison 345 is varied in wall thickness according to sizes of various portions of the tank body to be obtained. That is, as to each portion where the diameter of the resulting molded product is to be enlarged (blow ratio is to be enlarged, i.e. the ratio between the diameter of the parison 345 and that of the molded product) relative to the diameter of the parison 345, the wall thickness of the parison 345 is increased.

Figure 25A:
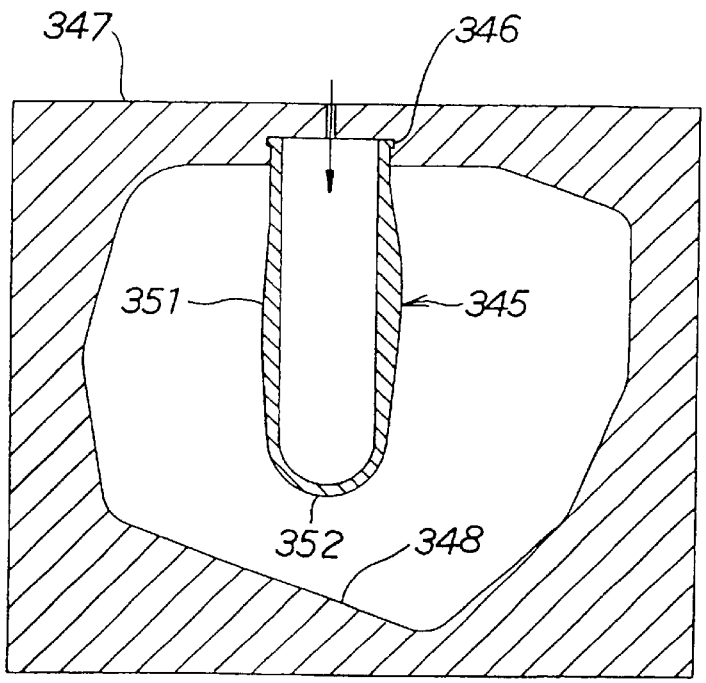
FIG. 25 is a second half of an operational diagram illustrating the tank body manufacturing method.
Figure 25B:
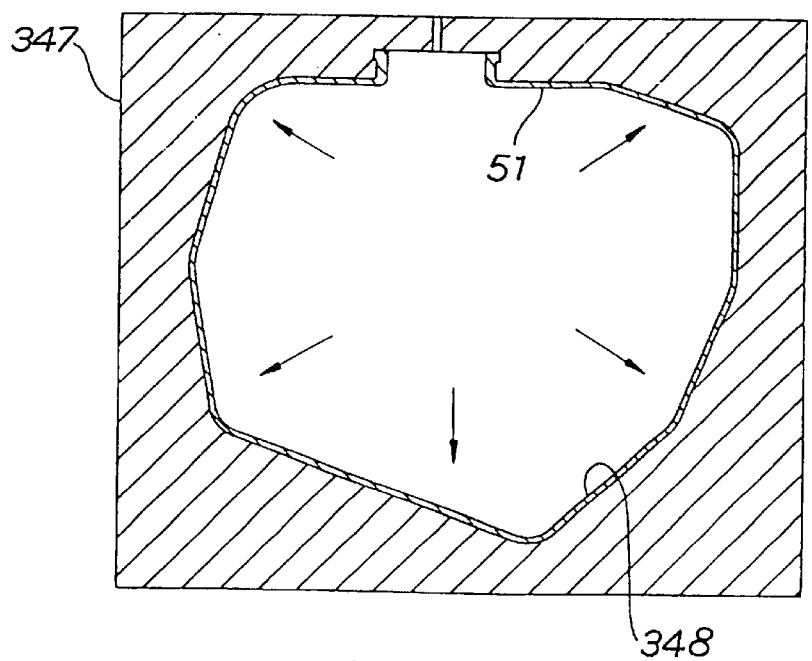

In FIG. 25(a), the parison 345 obtained by injection molding is loaded into a blow mold 347 at a base end portion 346 thereof. Numeral 348 denotes a cavity. Next, a body portion 351 and a bottom portion 352 of the parison 345 which faces the cavity 348 are heat-softened by means of a heater (not shown) and a high-pressure air is blown against the parison 345 in the blow mold 347 from a blow molding machine (not shown). In FIG. 25(b), the parison 345 (see FIG. 25(a)) swells and comes into close contact with an inner surface of the cavity 348. The mold 347 solidifies on cooling to afford the tank body 51. Thereafter, the blow mold 347 is opened and the tank 51 is taken out.

Figure 26A:
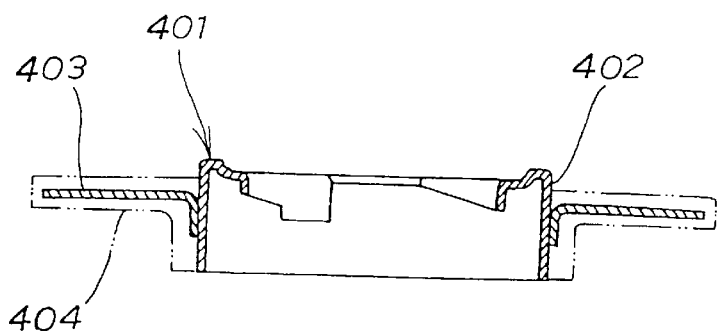
FIG. 26 is an explanatory diagram showing a comparative example of a fuel tank structure.
Figure 26B:
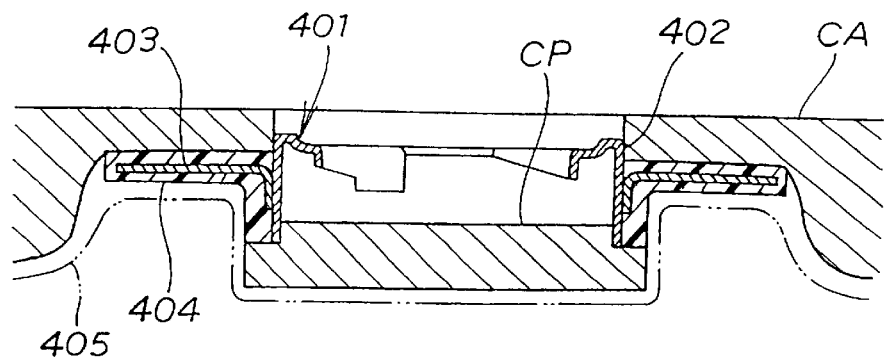
Figure 26C:
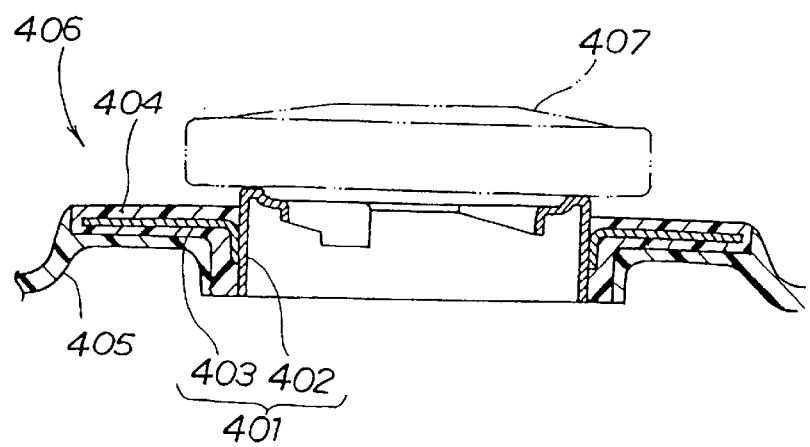

FIGS. 26(a) to (c) are explanatory diagrams showing a comparative example of a fuel tank structure and illustrating in what manner a fuel supply port portion of a resinous fuel tank is to be formed by insert molding.

In FIG. 26(a), a metallic filler 401 with flange is provided. Numerals 402 and 403 denote a cylindrical portion and a flange portion, respectively. First, upper and lower surfaces of the flange portion 403 and an outer peripheral surface of the cylindrical portion 402 are coated with resin to form a resin film 404. In FIG. 26(b), the filler 401 thus coated with the resin film 404 is disposed within a cavity of a blow mold CA and a tank body 405 is fabricated by blow molding of resin. The reference mark CP denotes a cap which closes a lower opening of the cylindrical portion 402. In FIG. 26(c), the resin film 404 below the flange portion 403 becomes integral with the tank body 405 to complete a fuel tank 406. Numeral 407 denotes a filler cap.

Thus, in case of an insert molding wherein the metallic filler 401 is rendered integral with the fuel tank 406 by molding, it is necessary that the filler 401 be coated with the resin film 404. Also, for positioning the filler 401 within the mold CA, it is necessary to form a hole in the mold CA for fitting therein of the cylindrical portion 402 or provide the cap CP for closing the opening of the cylindrical portion 402, with the result that the manufacturing process for the fuel tank 406, especially the tank body 405, becomes complicated and therefore not only the manufacturing cost increases, but also the productivity is deteriorated. Further, since the filler 401 is coated with the resin film 404, the wall thickness of the tank body 405 increases at its portions corresponding to the position of the cylindrical portion 402 and the position of the flange portion 403, and in the case where insert molding is performed at plural portions, it becomes difficult to ensure a required capacity of the fuel tank 406.

On the other hand, in the fuel tank structure according to the present invention, for example in the fuel tank 21 of the first embodiment, as shown in FIG. 4, the fuel supply port portion 52 with such tank fittings as fuel pump 5 and residual fuel meter unit 61 incorporated therein as the tank fittings assembly 55 is provided separately from the tank body 51 and is mounted to the tank body removably, thus eliminating the need of forming mounting portions for mounting tank fittings on the tank body side. Consequently, the structure of the tank body 51 can be simplified, and in case of forming the tank body 51 with resin, it is not necessary to conduct insert molding, but a simple blow molding will do, thus permitting easy manufacture of the tank body 51. Accordingly, it is possible to reduce the manufacturing cost of the fuel tank 21.

Moreover, since insert molding is not needed, it is possible to thin the tank body 51 and ensure a required capacity of the fuel tank 21 easily. Further, since the mounting positions of tank fittings are concentrated in the fuel supply port portion 52, it is possible to effect assembly of the fuel supply port portion efficiently. Consequently, it is possible to improve the productivity of the fuel tank 21.

The present invention constructed as above exhibits many beneficial effects. For example, since a fuel supply port portion integrally incorporating such tank fittings as a fuel pump and a residual fuel meter unit therein is formed separately from a tank body of a fuel tank and is removably attached to the tank body, it is not necessary to form tank fittings mounting portions on the tank body side. Therefore, it is possible to simplify the structure of the tank body, and in the case where the tank body is formed with resin, it is not necessary to perform insert molding, but a simple blow molding will do, thus making it possible to fabricate the tank body easily. Consequently, it is possible to reduce the fuel tank manufacturing cost. Also, since insert molding is not needed, it is possible to reduce the wall thickness of the tank body and hence possible to ensure a required capacity of the fuel tank easily. Further, since the tank fittings mounting positions are concentrated in the fuel supply port portion, the assembly of the fuel supply port portion can be done efficiently.

The fuel supply port portion is provided with the fuel pump, a fuel filter housing which receives therein a fuel filter disposed on a discharge side of the fuel pump, and a tank mounting portion for mounting the fuel supply port portion to the tank body removably, in this order, and one of a pair of pump shaft support portions for supporting a pump shaft of the fuel pump and one end portion of the fuel filter housing are integrally connected with each other. Therefore, it is possible to assemble the fuel supply port portion easily and hence possible to improve the productivity of the fuel tank. Also, a fuel passage can be formed integrally in part of one pump shaft support portion and the fuel filter housing without separately using a conduit such as a hose or the like for connecting the fuel pump and the fuel filter housing with each other, thus permitting reduction in the number of components used and also in the number of conduit mounting steps. Further, the distance between each pump shaft support portion and the fuel filter housing can be shortened and therefore it is possible to utilize the space concerned effectively and constitute the fuel supply port portion compactly in a small size.

A pressure regulator for regulating the pressure of fuel to be fed to an engine side is disposed in the fuel supply port portion, and an end portion of the pressure regulator and an opposite end portion of the fuel filter housing are integrally connected with each other. Accordingly, it is possible to assemble the fuel supply port portion easily and hence possible to improve the productivity of the fuel tank. Moreover, since a fuel passage can be formed integrally in part of one pump shaft support portion, fuel filter hosing and pressure regulator without separately using conduits such as hoses or the like for connection of the fuel pump, fuel filter housing and pressure regulator, it is possible to reduce the number of components used and the number of conduit mounting steps. Further, the distances among the pump shaft support portions, fuel filter housing, and pressure regulator can be made small, thus making it possible to utilize the space concerned effectively and constitute the fuel supply port portion compactly in a small size.

Since a part of a discharge path for discharge of the fuel to the exterior of the fuel tank is formed in the pressure regulator integrally by molding, it is possible to reduce the number of components used and hence possible to reduce the pressure regulator manufacturing cost and mounting cost in comparison with the case where the discharge path is formed separately from the pressure regulator.

Since the tank mounting portion is cylindrical, a filler is attached to one opening side of the tank mounting portion, a part on an opposite opening side of the tank mounting portion is extended to form an extended portion, and the fuel pump is attached to the extended portion, it is easier to mount the filler to the tank mounting portion which is cylindrical, and it is possible to accommodate tank fittings and form a fuel passage in the interior of the cylinder. Moreover, since the extended portion is formed, the fuel pump and other tank fittings can be mounted easily to the extended portion.

A filler-side cylindrical portion is provided in the filler, a receiving portion is formed at an opening end of the filler-side cylindrical portion, the tank body is formed by blow molding, and a tank-side cylindrical portion is provided on an opening side of the tank body, the tank-side cylindrical portion having a protuberance to be engaged with the receiving portion disengageably. By fitting the filler-side cylindrical portion of the filler onto the tank-side cylindrical portion of the tank body and by bringing the receiving portion of the filler-side cylindrical portion into engagement with the protuberance of the tank-side cylindrical portion, the filler can be coupled to the tank body easily. Therefore, it is possible to improve the assemblability and reduce the assembling time and cost.

A cylindrical holder is attached to the fuel supply port portion, the tank fittings are incorporated in the cylindrical holder, a float for detecting a residual fuel quantity is provided in the residual fuel meter unit incorporated in the fuel supply port portion, the float being movable vertically through an arm, and a highest or lowest position in the range of the vertical movement of the float is set within a virtual extended cylinder as an extension of an outer peripheral surface of the cylindrical holder. According to this construction, if the float is disposed at its highest or lowest position in the range of its vertical movement and is substantially aligned with the longitudinal direction of the cylindrical holder, the float is not an obstacle when the fuel supply port portion is inserted into the tank body, and it is possible to assemble the fuel tank smoothly and improve the productivity of the fuel tank.

A guide pipe is installed in the fuel supply port portion, the guide pipe functioning to conduct the fuel into the tank body during fuel supply and direct a fuel flow in a direction inclined relative to an extending direction of a virtual line which connects an inlet of the fuel supply port portion and the tank fittings, thereby allowing the fuel to flow while avoiding the tank fittings. Thus, with the guide pipe, the fuel can be conducted into the tank body and can flow while avoiding the tank fittings, whereby it is possible to make the fuel flow smooth and prevent bubbling of the fuel.

A cylindrical holder is attached to the fuel supply port portion, the tank fittings are incorporated in the cylindrical holder, an outlet of the guide pipe is allowed to face an inner surface of the cylindrical holder located between the fuel supply port portion and the tank fittings, and a through hole is formed in a side face portion of the cylindrical holder adjacent to the outlet. According to this construction, the fuel can be allowed to flow smoothly from the outlet of the guide pipe into the tank body through the through hole formed in the cylindrical holder and therefore it is possible to prevent bubbling of the fuel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicular fuel tank structure comprising:
a fuel supply port portion incorporating a tank fitting assembly integrally therein, said tank fitting assembly including a fuel pump and a residual fuel meter unit, said fuel supply port portion being formed as a separate member from a tank body of a fuel tank, and said fuel supply port portion being removably attached to said tank body, wherein said fuel supply port portion includes a filler, and a filler cap which closes a mouth of said filler and said filler is operatively connected to said tank fitting assembly.

2. The vehicular fuel tank structure according to claim 1, wherein said fuel supply port portion is provided with said fuel pump, a fuel filter housing which receives therein a fuel filter disposed on a discharge side of the fuel pump, and a tank mounting portion for mounting the fuel supply port portion to said tank body removably, in this order, and one of a pair of pump shaft support portions for supporting a pump shaft of the fuel pump and one end portion of said fuel filter housing are integrally connected with each other.

3. The vehicular fuel tank structure according to claim 2, wherein a pressure regulator for regulating the pressure of fuel to be supplied to an engine side is provided in said fuel supply port portion, and an end portion of said pressure regulator and an opposite end portion of said fuel filter housing are integrally connected with each other.

4. The fuel tank structure according to claim 3, wherein a part of a discharge path for discharge of the fuel to the exterior of the fuel tank is formed in said pressure regulator integrally by molding.

5. The vehicular fuel tank structure according to claim 2, wherein said tank mounting portion is cylindrical, the filler serves as a fuel inlet port of the fuel tank is attached to one opening side of the tank mounting portion, a part on an opposite opening side of the tank mounting portion is extended to form an extended portion, and said fuel pump is attached to said extended portion.

6. The vehicular fuel tank structure according to claim 1, wherein the filler serves as a fuel inlet port is provided in said fuel supply port portion, a filler-side cylindrical portion is provided in the filler, a receiving portion is formed at an opening end of said filler-side cylindrical portion, said tank body is formed by blow molding, and a tank-side cylindrical portion is provided on an opening side of the tank body, said tank-side cylindrical portion having a protuberance to be disengageably engaged with said receiving portion.

7. The vehicular fuel tank structure according to claim 1, wherein a cylindrical holder is attached to said fuel supply port portion, said tank fittings are incorporated in said cylindrical holder, a float for detecting a residual fuel quantity is provided in said residual fuel meter unit incorporated in the fuel supply port portion, said float being movable vertically through an arm, and a highest or lowest position in the range of the vertical movement of said float is set within a virtual extended cylinder as an extension of an outer peripheral surface of said cylindrical holder.

8. The vehicular fuel tank structure according to claim 1, wherein a guide pipe is installed in said fuel supply port portion, said guide pipe functioning to conduct the fuel into said tank body during fuel supply and direct a fuel flow in a direction inclined relative to an extending direction of a virtual line which connects an inlet of the fuel supply port portion and said tank fittings, thereby allowing the fuel to flow while avoiding the tank fittings.

9. The vehicular fuel tank structure according to claim 8, wherein a cylindrical holder is attached to said fuel supply port portion, said tank fittings are incorporated in said cylindrical holder, an outlet of said guide pipe is allowed to face an inner surface of the cylindrical holder located between the fuel supply port portion and the tank fittings, and a through hole is formed in a side face portion of the cylindrical holder adjacent to said outlet.

10. A vehicular fuel tank assembly comprising:
   a tank body having a opening therein;
   a fuel supply port portion removably attached to said tank body, said fuel supply port portion including a tank fittings assembly which is partially inserted into said tank body through said opening, said tank fittings assembly including a fuel pump, a pump holder for holding said fuel pump, and a residual fuel meter unit attached to said pump holder; wherein said fuel supply port portion includes a filler, and a filler cap which closes a mouth of said filler and said filler is operatively connected to said tank fittings assembly.

11. The vehicular fuel tank assembly as set forth in claim 10, wherein said tank body includes a flange portion formed along an edge portion of said opening, said fuel supply port portion includes a flange extending therearound, and said fuel supply port portion is fixed to said tank body with at least one clamp member.

12. The vehicular fuel tank assembly as set forth in claim 10, wherein said pump holder comprises a cylindrical portion, and a pump support portion extending from said cylindrical portion, said residual fuel meter unit being located at an end portion of said pump support portion.

13. The vehicular fuel tank assembly as set forth in claim 12, wherein said cylindrical portion further comprises a tank body-side inserting portion for insertion into said opening of said tank body, a fuel supply port-side inserting portion for insertion into an opening of the fuel supply port portion, and a flange formed between said tank body-side inserting portion and said fuel supply port-side inserting portion.

14. The vehicular fuel tank assembly as set forth in claim 13, wherein said cylindrical portion further comprises a first O-ring fitted on said tank body-side inserting portion, and a second O-ring fitted on the fuel support port-side inserting portion.

15. The vehicular fuel tank assembly as set forth in claim 10, wherein said fuel supply port portion further comprises a fuel filter housing located at a discharge side of said fuel pump for receiving a fuel filter therein.

16. The vehicular fuel tank assembly as set forth in claim 15, wherein said fuel supply port portion further comprises a pressure regulator for regulating a pressure of fuel to be supplied from said fuel pump.

17. The vehicular fuel tank assembly as set forth in claim 16, wherein an end portion of said pressure regulator and an end portion of said fuel filter housing are integrally connected with each other.

18. The vehicular fuel tank assembly as set forth in claim 10, wherein said fuel supply port portion further comprises a pair of pump shaft support portions for supporting a pump shaft of said fuel pump.

19. The vehicular fuel tank assembly as set forth in claim 10, wherein said fuel supply port portion includes a guide pipe therein for conducting fuel into said tank body during fuel supply and directing a fuel flow in a direction away from said tank fittings assembly.

* * * * *